United States Patent
Hafenrichter et al.

(10) Patent No.: US 12,246,522 B2
(45) Date of Patent: Mar. 11, 2025

(54) NOZZLES AND SYSTEMS FOR ADHESIVELY ATTACHING A FIRST PART TO A SECOND PART

(71) Applicant: The Boeing Company, Chicago, IL (US)

(72) Inventors: Joseph L. Hafenrichter, Auburn, WA (US); Gary E. Georgeson, Tacoma, WA (US); Marc J. Piehl, Renton, WA (US)

(73) Assignee: The Boeing Company, Arlington, VA (US)

( * ) Notice: Subject to any disclaimer, the term of this patent is extended or adjusted under 35 U.S.C. 154(b) by 665 days.

(21) Appl. No.: 17/494,622

(22) Filed: Oct. 5, 2021

(65) Prior Publication Data

US 2023/0103740 A1    Apr. 6, 2023

(51) Int. Cl.
*B32B 37/00* (2006.01)

(52) U.S. Cl.
CPC ................. *B32B 37/0046* (2013.01)

(58) Field of Classification Search
None
See application file for complete search history.

(56) References Cited

U.S. PATENT DOCUMENTS

| | | | |
|---|---|---|---|
| 4,735,169 A * | 4/1988 | Cawston | B05C 5/001 425/467 |
| 4,750,960 A | 6/1988 | Bubeck | |
| 4,795,451 A | 1/1989 | Buckley | |
| 6,117,490 A * | 9/2000 | Nishida | B05C 5/0254 118/232 |
| 6,294,020 B1 * | 9/2001 | Luthje | G03F 7/18 118/232 |
| 6,802,904 B2 * | 10/2004 | Pedigrew | B27D 5/003 118/410 |
| 6,811,613 B2 * | 11/2004 | Kitano | H01L 21/6715 118/712 |
| 8,651,046 B1 | 2/2014 | Davancens et al. | |
| 9,061,311 B2 * | 6/2015 | Tsuchida | B05C 1/00 |
| 9,139,952 B2 * | 9/2015 | Hangley | A41B 5/00 |
| 9,731,316 B2 * | 8/2017 | Ukegawa | A61F 13/15593 |
| 10,543,505 B2 * | 1/2020 | Ochi | B05B 1/26 |
| 10,610,942 B2 * | 4/2020 | Bergström | B05C 11/1034 |
| 10,646,894 B2 * | 5/2020 | Kuo | B05C 11/045 |
| 11,583,887 B2 * | 2/2023 | Burmester | B05C 5/0262 |
| 11,738,520 B2 * | 8/2023 | Georgeson | B25J 9/042 118/500 |
| 11,878,322 B2 * | 1/2024 | Niedt | B05D 1/265 |

(Continued)

*Primary Examiner* — Jethro M. Pence
(74) *Attorney, Agent, or Firm* — Kunzler Bean & Adamson

(57) ABSTRACT

A nozzle for dispensing adhesive between a first part and a second part comprises a nozzle body. The nozzle body comprises a first-part engagement surface. The nozzle body also comprises a second-part engagement surface, contiguous with the first-part engagement surface and defining an engagement-surface angle, greater than 0° and less than 180°, with a virtual plane, coincident with the first-part engagement surface. The nozzle body further comprises a nozzle-body outlet port, formed in the second-part engagement surface. The nozzle body additionally comprises a nozzle-body inlet port, formed in the first-part engagement surface. The nozzle also comprises a separator plate, coupled with and extending from the nozzle body.

20 Claims, 20 Drawing Sheets

(56) References Cited

U.S. PATENT DOCUMENTS

| | | | |
|---|---|---|---|
| 11,938,510 B2 * | 3/2024 | Suzuki | B05C 5/0275 |
| 11,993,879 B2 * | 5/2024 | Niedt | D04H 1/593 |
| 12,005,467 B2 * | 6/2024 | Georgeson | B05C 11/00 |
| 12,005,468 B2 * | 6/2024 | Georgeson | B05C 9/04 |
| 12,036,576 B2 * | 7/2024 | Burmester | B05C 5/0262 |
| 2001/0021419 A1 * | 9/2001 | Luthje | B05C 11/1034 |
| | | | 438/782 |
| 2002/0152957 A1 * | 10/2002 | Pedigrew | B27D 5/003 |
| | | | 118/410 |
| 2003/0137080 A1 | 7/2003 | Bouras et al. | |
| 2017/0197350 A1 | 7/2017 | Song | |
| 2017/0246654 A1 * | 8/2017 | Pringle, IV | B05C 17/00589 |
| 2019/0344293 A1 | 11/2019 | Knott et al. | |
| 2021/0138500 A1 * | 5/2021 | Niedt | B05D 5/10 |
| 2023/0107716 A1 | 4/2023 | Georgeson et al. | |

* cited by examiner

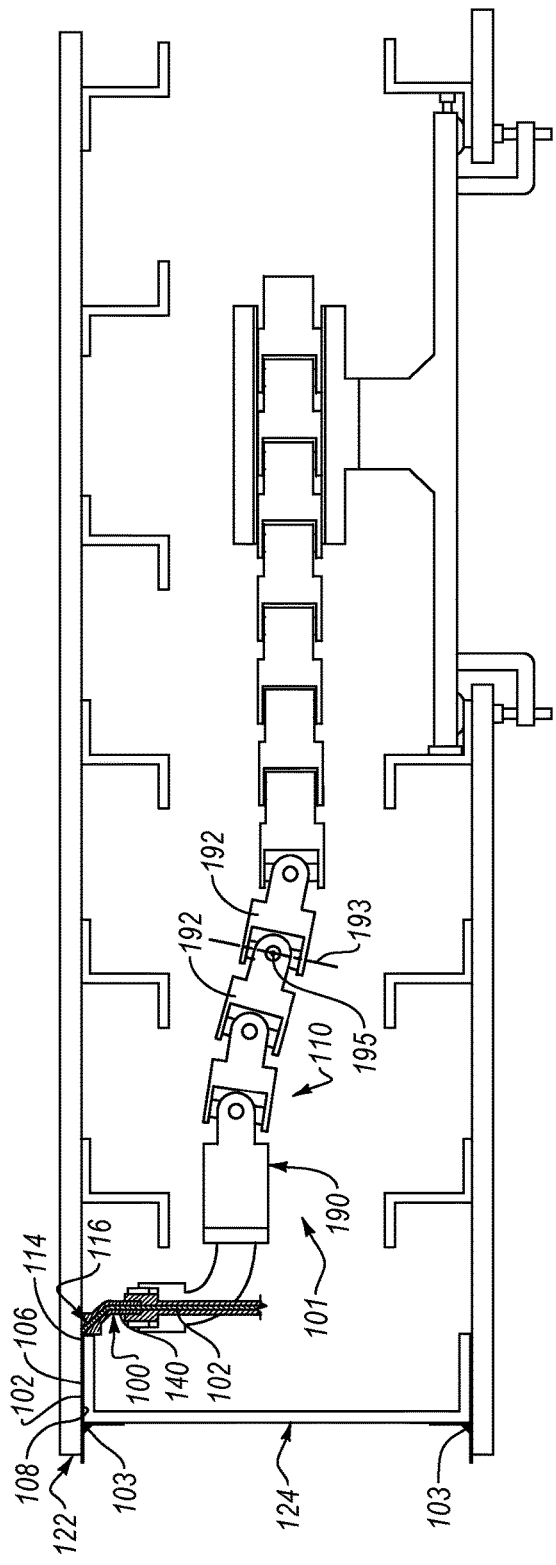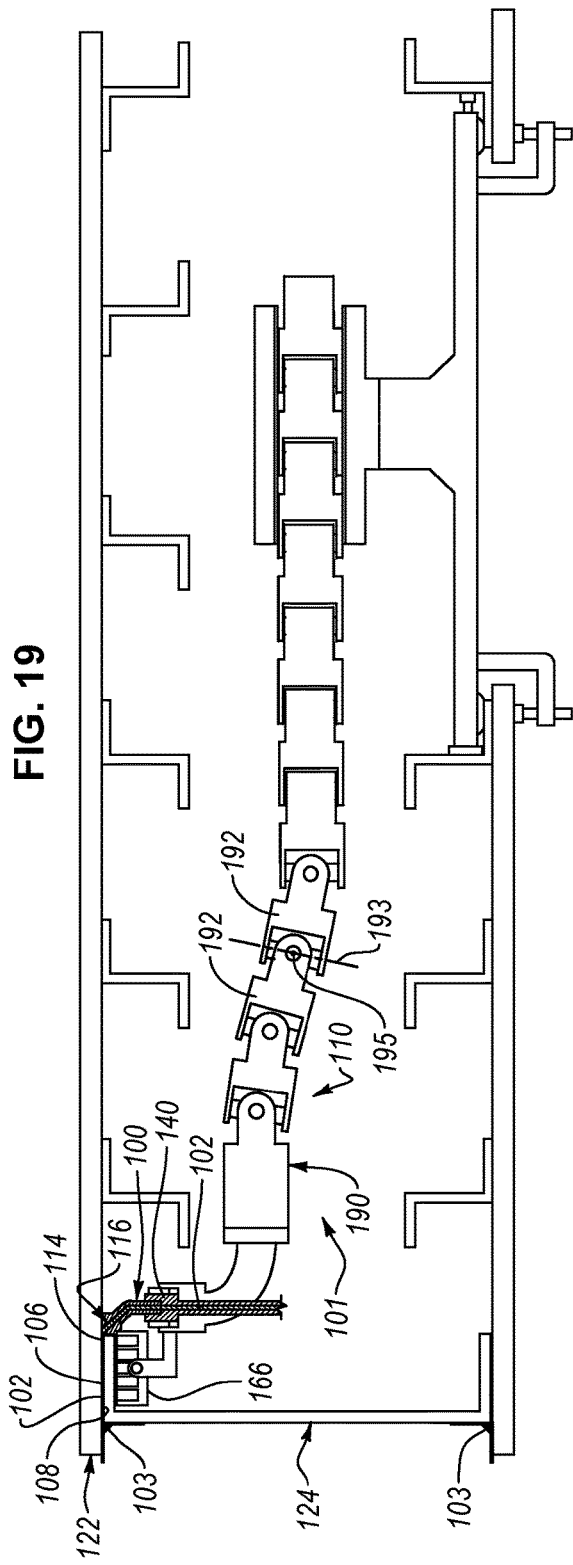

NOZZLES AND SYSTEMS FOR ADHESIVELY ATTACHING A FIRST PART TO A SECOND PART

TECHNICAL FIELD

Described herein are nozzles and systems for adhesively attaching a first part to a second part.

BACKGROUND

During assembly of structures, such as aircraft or components thereof, parts are often adhesively interconnected. It is desirable to increase the speed at which adhesive is deposited between the parts, being interconnected, to reduce manufacturing lead time and cost. However, the need for creating and maintaining a properly sized gap between faying surfaces of the parts for receiving the adhesive complicates the task of increasing the speed, at which adhesive is deposited between the faying surfaces. Deposition of adhesive is further complicated by the fact that propagation of the adhesive between the parts must often be controlled to prevent the adhesive from being deposited in locations, where its presence is undesirable or unnecessary.

SUMMARY

Accordingly, apparatuses and methods, intended to address at least the above-identified concerns, would find utility.

The following is a non-exhaustive list of examples of the subject matter, disclosed herein.

Disclosed herein is a nozzle for dispensing adhesive between a first part and a second part. The nozzle comprises a nozzle body, which comprises a first-part engagement surface and a second-part engagement surface. The second-part engagement surface is contiguous with the first-part engagement surface and defines an engagement-surface angle, greater than 0° and less than 180°, with a virtual plane, coincident with the first-part engagement surface. The nozzle body further comprises a nozzle-body outlet port, formed in the second-part engagement surface, and a nozzle-body inlet port, formed in the first-part engagement surface. The nozzle also comprises a separator plate, coupled with and extending from the nozzle body.

The nozzle provides for depositing the adhesive, through the nozzle-body outlet port, into the space between the first part and the second part, and promoting uniform distribution of the adhesive in the space by receiving a portion of the adhesive into the nozzle-body inlet port. Receiving the portion of the adhesive into the nozzle-body inlet port enables uniform distribution of the adhesive throughout the space by promoting flow of the adhesive between the first part and the second part. Additionally, the nozzle-body outlet port and the nozzle-body inlet port, being on the nozzle body, help reduce buildup of excess of the adhesive outside of the space without the need for another nozzle. The separator plate promotes separation between the first part and the second part to create the space. The nozzle-body outlet port and the separator plate enable the adhesive to be deposited, through the nozzle-body outlet port, into the space when the separator plate is located between and is separating the first part and the second part. Accordingly, a configuration of the nozzle-body outlet port and the separator plate maintains separation between the first part and the second part as the adhesive is deposited, through the nozzle-body outlet port, between the first part and the second part. In contrast, the nozzle-body inlet port and the separator plate enable excess portions of the adhesive, deposited from the nozzle-body outlet port and collected outside of the space, to be urged (e.g., drawn via a suction force) into the nozzle-body inlet port when the separator plate is located between and is separating the first part and the second part. Accordingly, a configuration of the nozzle-body inlet port and the separator plate maintains separation between the first part and the second part as excess portions of the adhesive, accumulating outside of the space, are urged away from the first part and the second part through the nozzle-body inlet port. The second-part engagement surface, defining the engagement-surface angle, greater than 0° and less than 180°, with the virtual plane, coincident with the first-part engagement surface, enables the nozzle body to form a complementary engagement with the first part and the second part as the nozzle body translationally moves along the first part and the second part.

Also disclosed herein is a system for dispensing adhesive between a first part and a second part. The system comprises a nozzle, which comprises a nozzle body. The nozzle body comprises a first-part engagement surface and a second-part engagement surface, contiguous with the first-part engagement surface and defining an engagement-surface angle, greater than 0° and less than 180°, with a virtual plane, coincident with the first-part engagement surface. The nozzle body further comprises a nozzle-body outlet port, formed in the second-part engagement surface, and a nozzle-body inlet port, formed in the first-part engagement surface. The nozzle additionally comprises a separator plate, coupled with and extending from the nozzle body. The system further comprises a reservoir, fluidically coupled with the nozzle-body outlet port, and a vacuum source, fluidically coupled with the nozzle-body inlet port. The system additionally comprises a vehicle, supporting the nozzle.

The system facilitates the dispensing of the adhesive between the first part and the second part in a fast and efficient manner. The nozzle provides for depositing the adhesive, through the nozzle-body outlet port, into the space between the first part and the second part, and promoting uniform distribution of the adhesive in the space by receiving a portion of the adhesive into the nozzle-body inlet port. Receiving the portion of the adhesive into the nozzle-body inlet port enables uniform distribution of the adhesive throughout the space by promoting flow of the adhesive between the first part and the second part. Additionally, the nozzle-body outlet port and the nozzle-body inlet port, being on the nozzle body, help reduce buildup of excess of the adhesive outside of the space without the need for another nozzle. The separator plate promotes separation between the first part and the second part to create the space. The nozzle-body outlet port and the separator plate enable the adhesive to be deposited, through the nozzle-body outlet port, into the space when the separator plate is located between and is separating the first part and the second part. Accordingly, a configuration of the nozzle-body outlet port and the separator plate maintains separation between the first part and the second part as the adhesive is deposited, through the nozzle-body outlet port, between the first part and the second part. In contrast, the nozzle-body inlet port and the separator plate enable excess portions of the adhesive, deposited from the nozzle-body outlet port and collected outside of the space, to be urged (e.g., drawn via a suction force) into the nozzle-body inlet port when the separator plate is located between and is separating the first part and the second part. Accordingly, a configuration of the nozzle-body inlet port and the separator plate maintains separation between the first part and the second part as excess portions of the adhesive, accumulating outside of the space, are urged away from the first part and the second part through the nozzle-body inlet port. The second-part engagement surface, defining the engagement-surface angle, greater than 0° and less than 180°, with the virtual plane, coincident with the first-part engagement surface, enables the nozzle body to form a complementary engagement with the first part and the second part as the nozzle body translationally moves along the first part and the second part. The vehicle enables movement of the nozzle relative to the first part and the second part for insertion of the separator plate between the first part and the second part and for depositing the adhesive between and along the first part and the second part.

BRIEF DESCRIPTION OF THE DRAWINGS

Reference will now be made to the accompanying drawings, which are not necessarily drawn to scale, and where like reference characters designate the same or similar parts throughout the several views. In the drawings:

FIG. 19 is a schematic, elevation, sectional view of the system of FIG. 1, according to one or more examples of the subject matter, disclosed herein; and FIG. 20 is a schematic, elevation, sectional view of the system of FIG. 1, according to one or more examples of the subject matter, disclosed herein.

DETAILED DESCRIPTION

Figure 1:
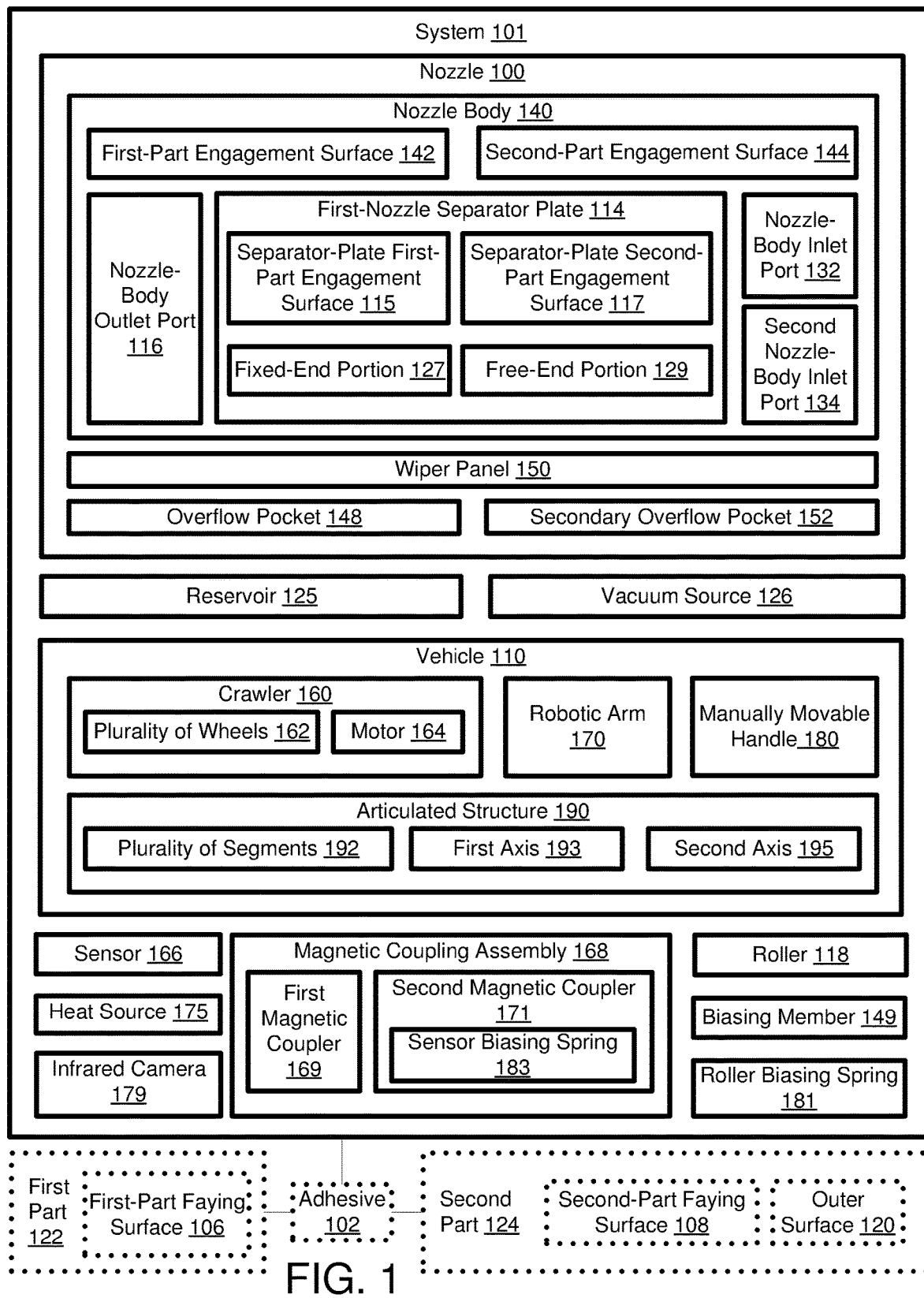
FIG. 1 is a block diagram of a system for adhesively attaching a first part to a second part, according to one or more examples of the subject matter, disclosed herein.

In FIG. 1, referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples of the subject matter, disclosed herein. Likewise, elements and/or components, if any, represented with dashed lines, indicate alternative examples of the subject matter, disclosed herein. One or more elements shown in solid and/or dashed lines may be omitted from a particular example without departing from the scope of the subject matter, disclosed herein. Environmental elements, if any, are represented with dotted lines. Virtual (imaginary) elements may also be shown for clarity. Those skilled in the art will appreciate that some of the features illustrated in FIG. 1 may be combined in various ways without the need to include other features described in FIG. 1, other drawing figures, and/or the accompanying disclosure, even though such combination or combinations are not explicitly illustrated herein. Similarly, additional features not limited to the examples presented, may be combined with some or all of the features shown and described herein.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one or more examples" means that one or more feature, structure, or characteristic described in connection with the example is included in at least one implementation. The phrase "one or more examples" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Illustrative, non-exhaustive examples of the subject matter, disclosed herein, are provided below.

Referring generally to FIG. 1 and particularly to, e.g., FIGS. 2A-5 for illustrative purposes only and not by way of limitation, the following portion of this paragraph delineates example 1 of the subject matter, disclosed herein. According to example 1, nozzle 100 for dispensing adhesive 102 between first part 122 and second part 124 comprises nozzle body 140. Nozzle body 140 comprises first-part engagement surface 142 and second-part engagement surface 144, which is contiguous with first-part engagement surface 142 and defines engagement-surface angle θ, greater than 0° and less than 180°, with a virtual plane, coincident with first-part engagement surface 142. Nozzle body 140 further comprises nozzle-body outlet port 116, formed in second-part engagement surface 144, and nozzle-body inlet port 132, formed in first-part engagement surface 142. Nozzle 100 also comprises separator plate 114, coupled with and extending from nozzle body 140.

Nozzle 100 provides for depositing adhesive 102, through nozzle-body outlet port 116, into a space (e.g., space 104) between first part 122 and second part 124, and promoting uniform distribution of adhesive 102 in space 104 by receiving a portion of adhesive 102 into nozzle-body inlet port 132. Receiving the portion of adhesive 102 into nozzle-body inlet port 132 enables uniform distribution of adhesive 102 throughout space 104 by promoting flow of adhesive 102 between first part 122 and second part 124. Additionally, nozzle-body outlet port 116 and nozzle-body inlet port 132, being on nozzle body 140, help reduce buildup of excess of adhesive 102 outside of space 104 without the need for another nozzle. Separator plate 114 promotes separation between first part 122 and second part 124 to create space 104. Nozzle-body outlet port 116 and separator plate 114 enable adhesive 102 to be deposited, through nozzle-body outlet port 116, into space 104 when separator plate 114 is located between and is separating first part 122 and second part 124. Accordingly, a configuration of nozzle-body outlet port 116 and separator plate 114 maintains separation between first part 122 and second part 124 as adhesive 102 is deposited, through nozzle-body outlet port 116, between first part 122 and second part 124. In contrast, nozzle-body inlet port 132 and separator plate 114 enable excess portions of adhesive 102, deposited from nozzle-body outlet port 116 and collected outside of space 104, to be urged (e.g., drawn via a suction force) into nozzle-body inlet port 132 when separator plate 114 is located between and is separating first part 122 and second part 124. Accordingly, a configuration of nozzle-body inlet port 132 and separator plate 114B maintains separation between first part 122 and second part 124 as excess portions of adhesive 102, accumulating outside of space 104, are urged away from first part 122 and second part 124 through nozzle-body inlet port 132. Second-part engagement surface 144, defining engagement-surface angle θ, greater than 0° and less than 180°, with the virtual plane, coincident with first-part engagement surface 142, enables nozzle body 140 to form a complementary engagement with first part 122 and second part 124 as nozzle body 140 translationally moves along first part 122 and second part 124.

Generally, nozzle 100 is designed to interact with the environment by depositing adhesive 102 between first part 122 and second part 124 and removing excess portions of adhesive 102 away from first part 122 and second part 124.

In some examples, separator plate 114 is made of a material that is more flexible than a material of first part 122 and a material of second part 124, which promotes compliancy of separator plate 114 when inserting separator plate 114 between first part 122 and second part 124. According to certain examples, separator plate 114 includes a beveled tip portion, which promotes ease in inserting separator plate 114 between first part 122 and second part 124.

In certain examples, adhesive 102 is one of an epoxy adhesive, a polyurethane adhesive, polyamide adhesives, or the like. Moreover, when delivered to and through nozzle-body outlet port 116, and when received into and removed from nozzle-body inlet port 132, adhesive 102 is in a flowable state, such as a glutinous, viscous, or extrudable state). After being deposited between first part 122 and second part 124, adhesive 102 is allowed to harden (e.g., via curing or air drying) to form the adhesive bond between first part 122 and second part 124.

Referring generally to FIG. 1 and particularly to, e.g., FIGS. 2A-5 for illustrative purposes only and not by way of limitation, the following portion of this paragraph delineates example 2 of the subject matter, disclosed herein. According to example 2, which encompasses example 1, above, nozzle-body outlet port 116 and nozzle-body inlet port 132 lie in different planes.

Nozzle-body outlet port 116 and nozzle-body inlet port 132, lying in different planes, enables adhesive 102 to be deposited into space 104 between first part 122 and second part 124 at an angle conducive to penetration into space 104 and promotes removal of excess portions of adhesive 102 at location where excess portions of adhesive 102 accumulate.

Referring generally to FIG. 1 and particularly to, e.g., FIGS. 2A-4 for illustrative purposes only and not by way of limitation, the following portion of this paragraph delineates example 3 of the subject matter, disclosed herein. According to example 3, which encompasses example 2, above, separator plate 114 extends from nozzle body 140 along a virtual plane, parallel to or containing first-part engagement surface 142.

Separator plate 114, extending from nozzle body 140 along the virtual plane, parallel to or containing first-part engagement surface 142, enables separator plate 114 to be inserted into space 104 between first part 122 and second part 124 while enabling first-part engagement surface 142 to be parallel with and translationally move along a surface of first part 122.

In some examples, the subject matter, disclosed herein includes axes, planes, and rays. Such axes, planes, and rays, unless otherwise indicated, are virtual imaginary features, used to define certain aspects of the subject matter. As used herein, "virtual" means having the attributes of an entity without possessing its physical form. For example, a virtual reference plane is an intangible or imaginary plane, rather than a physical one, with respect to which, e.g., location and/or orientation of other physical and/or intangible entities can be defined.

Figure 2A:
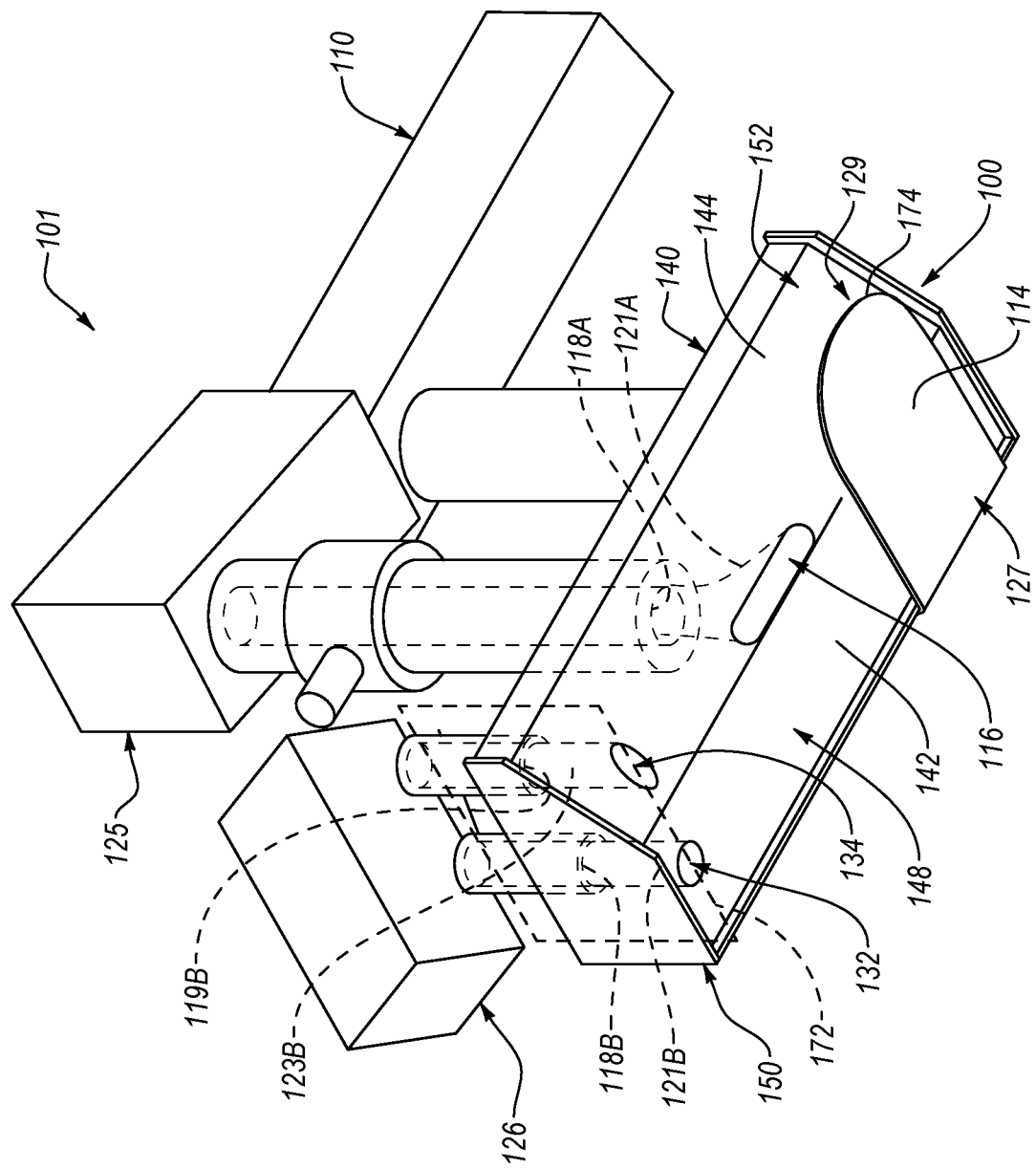
FIG. 2A is a schematic, perspective view of a nozzle of the system of FIG. 1, according to one or more examples of the subject matter, disclosed herein.
Figure 2B:
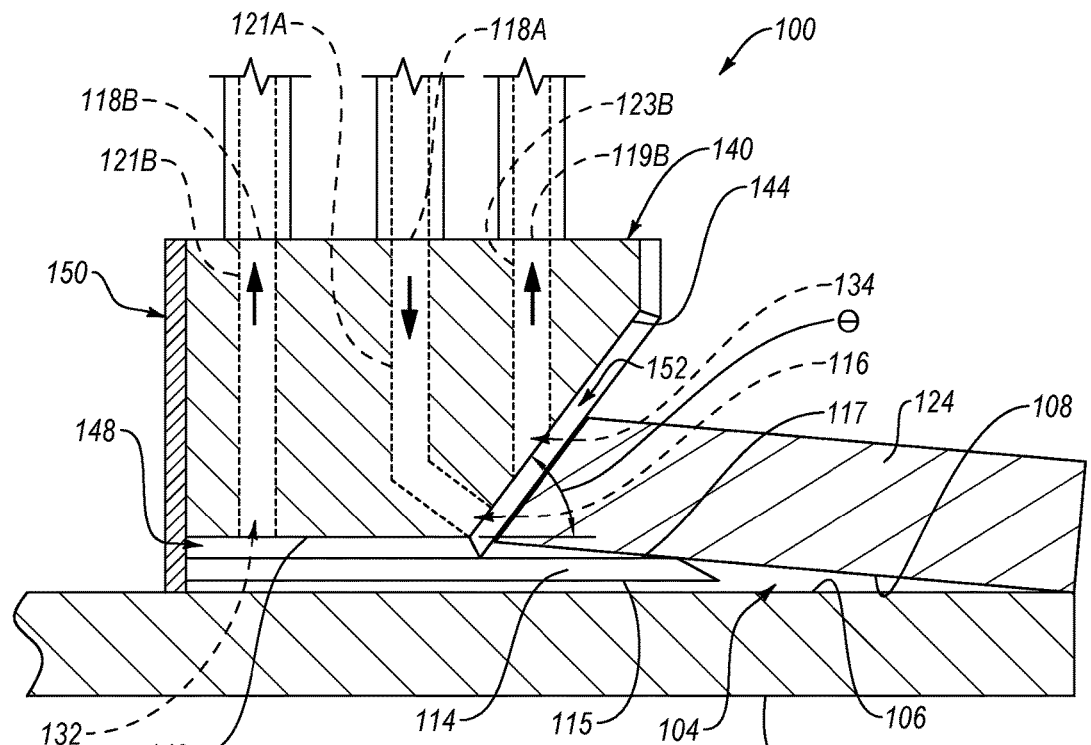
FIG. 2B is a schematic, elevation, sectional view of a nozzle of the system of FIG. 1, according to one or more examples of the subject matter, disclosed herein.
Figure 2C:
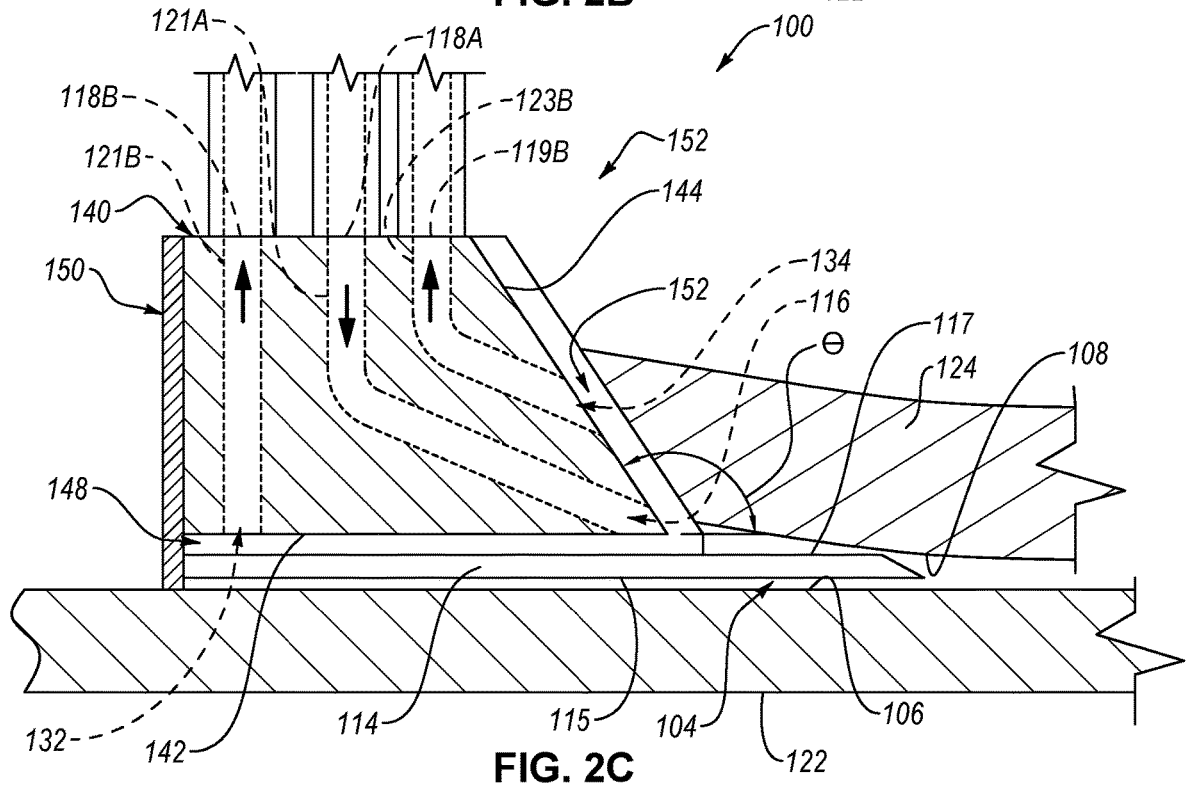
FIG. 2C is a schematic, elevation, sectional view of a nozzle of the system of FIG. 1, according to one or more examples of the subject matter, disclosed herein.

Referring generally to FIG. 1 and particularly to, e.g., FIGS. 2B and 2C for illustrative purposes only and not by way of limitation, the following portion of this paragraph delineates example 4 of the subject matter, disclosed herein. According to example 4, which encompasses example 3, above, separator plate 114 comprises separator-plate first-part engagement surface 115 and separator-plate second-part engagement surface 117. Separator-plate first-part engagement surface 115 and separator-plate second-part engagement surface 117 are parallel to each other.

Separator-plate first-part engagement surface 115 and separator-plate second-part engagement surface 117, being parallel to each other, enables flush contact with first-part faying surface 106 and second-part faying surface 108 and promotes a uniform thickness of space 104 between first part 122 and second part 124 when separator plate 114 is inserted into space 104 and moves translationally along space 104.

Referring generally to FIG. 1 and particularly to, e.g., FIGS. 2B and 2C for illustrative purposes only and not by way of limitation, the following portion of this paragraph delineates example 5 of the subject matter, disclosed herein. According to example 5, which encompasses example 4, above, separator-plate second-part engagement surface 117 is in contact with first-part engagement surface 142 of nozzle body 140. Separator-plate second-part engagement surface 117 is spaced away from first-part engagement surface 142 of nozzle body 140.

Separator-plate second-part engagement surface 117, being in contact with first-part engagement surface 142 of nozzle body 140, enables separator-plate second-part engagement surface 117 to be attached directly to first-part engagement surface 142, which promotes a strong and reliable coupling between separator plate 114 and nozzle body 140. Separator-plate second-part engagement surface 117, being spaced away from first-part engagement surface 142, enables separator plate 114 to be flush against first part 122 when separator plate 114 is inserted into space between first part 122 and second part 124.

Referring generally to FIG. 1 and particularly to, e.g., FIG. 2B for illustrative purposes only and not by way of limitation, the following portion of this paragraph delineates example 6 of the subject matter, disclosed herein. According to example 6, which encompasses any one of examples 3 to 5, above, separator plate 114 is located farther away from nozzle-body inlet port 132 than from nozzle-body outlet port 116.

Separator plate 114, being located farther away from nozzle-body inlet port 132 than from nozzle-body outlet port 116, enables nozzle-body outlet port 116 to trail separator plate 114 and enables nozzle-body inlet port 132 to trail nozzle-body outlet port 116, as nozzle 100 moves relative to first part 122 and second part 124 (e.g., in the direction indicated by a directional arrow in FIGS. 3 and 4) and as adhesive 102 is dispensed from nozzle-body outlet port 116 between first part 122 and second part 124.

Figure 3:
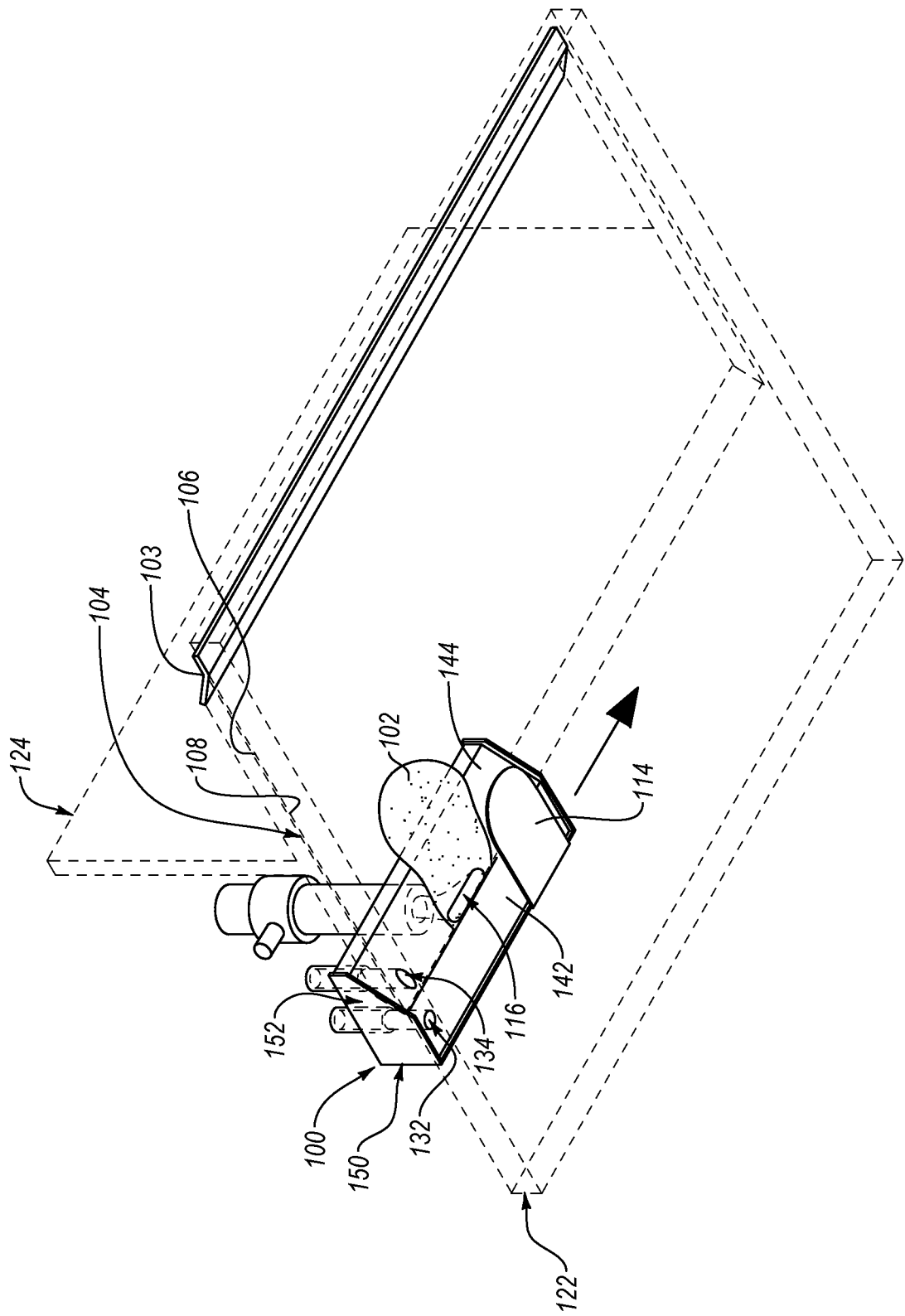
FIG. 3 is a schematic, perspective view of a nozzle of the system of FIG. 1, according to one or more examples of the subject matter, disclosed herein.

Referring generally to FIG. 1 and particularly to, e.g., FIGS. 2A-3 for illustrative purposes only and not by way of limitation, the following portion of this paragraph delineates example 7 of the subject matter, disclosed herein. According to example 7, which encompasses any one of examples 3 to 6, above, nozzle body 140 further comprises second nozzle-body inlet port 134, formed in second-part engagement surface 144.

Second nozzle-body inlet port 134 promotes removal of excess portions of adhesive 102 from a location between second-part engagement surface 144 and second part 124.

Referring generally to FIG. 1 and particularly to, e.g., FIGS. 2A-3 for illustrative purposes only and not by way of limitation, the following portion of this paragraph delineates example 8 of the subject matter, disclosed herein. According to example 8, which encompasses example 7 above, separator plate 114 is located farther away from second nozzle-body inlet port 134 than from nozzle-body outlet port 116.

Separator plate 114, being located farther away from second nozzle-body inlet port 134 than from nozzle-body outlet port 116, enables nozzle-body outlet port 116 to trail separator plate 114 and enables second nozzle-body inlet port 134 to trail nozzle-body outlet port 116, as nozzle 100 moves relative to first part 122 and second part 124 (e.g., in the direction, indicated by a directional arrow in FIGS. 3 and 4) and as adhesive 102 is dispensed from nozzle-body outlet port 116 between first part 122 and second part 124.

Referring generally to FIG. 1 and particularly to, e.g., FIG. 2A for illustrative purposes only and not by way of limitation, the following portion of this paragraph delineates example 9 of the subject matter, disclosed herein. According to example 9, which encompasses example 7 or 8, above, nozzle-body inlet port 132 and second nozzle-body inlet port 134 are spaced apart from each other. Virtual plane 172, perpendicular to first-part engagement surface 142 and second-part engagement surface 144, bisects each of nozzle-body inlet port 132 and second nozzle-body inlet port 134 into two equal parts.

Nozzle-body inlet port 132 and second nozzle-body inlet port 134, being spaced apart from each other, promotes removal of excess portions of adhesive 102 from different locations between nozzle body 140 and first part 122 and second part 124. Virtual plane 172, bisecting each of nozzle-body inlet port 132 and second nozzle-body inlet port 134 into two equal parts, promotes removal of excess portions of adhesive 102 at locations that are the same distance away from nozzle-body outlet port 116, and where excess portions of adhesive 102 are prone to accumulate.

Referring generally to FIG. 1 and particularly to, e.g., FIGS. 2A-5 for illustrative purposes only and not by way of limitation, the following portion of this paragraph delineates example 10 of the subject matter, disclosed herein. According to example 10, which encompasses any one of examples 7 to 9, above, second nozzle-body inlet port 134 is offset relative to nozzle-body inlet port 132 in a direction, perpendicular to first-part engagement surface 142.

Second nozzle-body inlet port 134, being offset relative to nozzle-body inlet port 132 in a direction, perpendicular to first-part engagement surface 142, enables removal from a first location between first-part engagement surface 142 and first part 122 and a second location between second-part engagement surface 144 and second part 124.

Referring generally to FIG. 1 and particularly to, e.g., FIGS. 2A-5 for illustrative purposes only and not by way of limitation, the following portion of this paragraph delineates example 11 of the subject matter, disclosed herein. According to example 11, which encompasses any one of examples 3 to 10, above, nozzle 100 further comprises wiper 150, coupled to nozzle body 140 and extending away from first-part engagement surface 142 in a direction, perpendicular to first-part engagement surface 142. Wiper 150 is more flexible than nozzle body 140.

Wiper 150 enables capture and containment of excess portions of adhesive 102. Moreover, wiper 150, being more flexible than nozzle body 140, enables a sealed engagement between wiper 150 and first part 122, to help contain excess portions of adhesive 102 between first-part engagement surface 142 and first part 122, and promotes non-damaging engagement between wiper 150 and first part 122.

Referring generally to FIG. 1 and particularly to, e.g., FIGS. 2A-5 for illustrative purposes only and not by way of limitation, the following portion of this paragraph delineates example 12 of the subject matter, disclosed herein. According to example 12, which encompasses example 11, above, wiper 150 further extends away from second-part engagement surface 144 in a direction, perpendicular to second-part engagement surface 144.

Wiper 150, extending away from second-part engagement surface 144 in a direction, perpendicular to second-part engagement surface 144, enables a sealed engagement between wiper 150 and second part 124, to help contain excess portions of adhesive 102 between second-part engagement surface 144 and second part 124, and promotes non-damaging engagement between wiper 150 and second part 124.

Referring generally to FIG. 1 and particularly to, e.g., FIGS. 2A-5 for illustrative purposes only and not by way of limitation, the following portion of this paragraph delineates example 13 of the subject matter, disclosed herein. According to example 13, which encompasses example 12, above, wiper 150 partially surrounds first-part engagement surface 142 from three sides and also partially surrounds second-part engagement surface 144 from two sides.

Wiper 150, partially surrounding first-part engagement surface 142 from three sides, enables excess portions of adhesive 102 (e.g., overfill) to accumulate and be contained between first-part engagement surface 142 and first part 122. Wiper 150, partially surrounding second-part engagement surface 144 from two sides, enables excess portions of adhesive 102 to accumulate and be contained between second-part engagement surface 144 and second part 124.

Referring generally to FIG. 1 and particularly to, e.g., FIGS. 2A-5 for illustrative purposes only and not by way of limitation, the following portion of this paragraph delineates example 14 of the subject matter, disclosed herein. According to example 14, which encompasses any one of examples 11 to 13, above, nozzle 100 further comprises overflow pocket 148, defined by wiper 150 and first-part engagement surface 142 of nozzle body 140. Nozzle-body inlet port 132 is in fluidic communication with overflow pocket 148.

Overflow pocket 148 promotes accumulation of overfill of adhesive 102 in a space, which is partially defined by outer surface 120 of first part 122, from which it can be easily removed via nozzle-body inlet port 132. Outer surface 120 of first part 122 is the surface of first part 122 adjacent to, but not including, first-part faying surface 106.

Referring generally to FIG. 1 and particularly to, e.g., FIGS. 2A-5 for illustrative purposes only and not by way of limitation, the following portion of this paragraph delineates example 15 of the subject matter, disclosed herein. According to example 15, which encompasses example 14, above, nozzle 100 further comprises secondary overflow pocket 152, defined by wiper 150 and second-part engagement surface 144 of nozzle body 140. Nozzle body 140 further comprises second nozzle-body inlet port 134, formed in second-part engagement surface 144. Second nozzle-body inlet port 134 is in fluidic communication with secondary overflow pocket 152.

Secondary overflow pocket 152 promotes accumulation of overfill of adhesive 102 in a space, from which it can be easily removed via second nozzle-body inlet port 134.

Referring generally to FIG. 1 and particularly to, e.g., FIGS. 2A-5 for illustrative purposes only and not by way of limitation, the following portion of this paragraph delineates example 16 of the subject matter, disclosed herein. According to example 16, which encompasses any one of examples 3 to 15, above, nozzle-body outlet port 116 and nozzle-body inlet port 132 have different shapes.

Nozzle-body outlet port 116 and nozzle-body inlet port 132, having different shapes, enables different flow patterns of adhesive 102 through nozzle-body outlet port 116 and nozzle-body inlet port 132, which accommodates wide dispersion of adhesive 102 from nozzle-body outlet port 116 and more narrow intake flow of adhesive 102 into nozzle-body inlet port 132.

Referring generally to FIG. 1 and particularly to, e.g., FIGS. 2A-3 for illustrative purposes only and not by way of limitation, the following portion of this paragraph delineates example 17 of the subject matter, disclosed herein. According to example 17, which encompasses any one of examples 1 to 16, above, first-part engagement surface 142 of nozzle body 140 is planar.

First-part engagement surface 142 of nozzle body 140, being planar, can correspond with a planar surface of first part 122, which promotes a space between first-part engagement surface 142 and first part 122 that has a uniform thickness and promotes uniform flow of excess portions of adhesive 102.

Referring generally to FIG. 1 and particularly to, e.g., FIGS. 2A-3 for illustrative purposes only and not by way of limitation, the following portion of this paragraph delineates example 18 of the subject matter, disclosed herein. According to example 18, which encompasses example 17, above, second-part engagement surface 144 of nozzle body 140 is planar.

Second-part engagement surface 144 of the nozzle body 140, being planar, can correspond with a planar surface of second part 124, which promotes a space between second-part engagement surface 144 and second part 124 that has a uniform thickness and promotes uniform flow of excess portions of adhesive 102.

Referring generally to FIG. 1 and particularly to, e.g., FIG. 2B for illustrative purposes only and not by way of limitation, the following portion of this paragraph delineates example 19 of the subject matter, disclosed herein. According to example 19, which encompasses any one of examples 1 to 18, above, engagement-surface angle θ between second-part engagement surface 144 and the virtual plane, coincident with first-part engagement surface 142, is less than 90°.

Engagement-surface angle θ between second-part engagement surface 144 and the virtual plane, coincident with first-part engagement surface 142, being less than 90°, enables nozzle body 140 to form a complementary engagement with first part 122 and second part 124, where second part 124 has a beveled flange, as nozzle body 140 translationally moves along first part 122 and second part 124.

Referring generally to FIG. 1 and particularly to, e.g., FIG. 2C for illustrative purposes only and not by way of limitation, the following portion of this paragraph delineates example 20 of the subject matter, disclosed herein. According to example 20, which encompasses any one of examples 1 to 18, above, engagement-surface angle θ between second-part engagement surface 144 and the virtual plane, coincident with first-part engagement surface 142, is greater than 90°.

Engagement-surface angle θ between second-part engagement surface 144 and the virtual plane, coincident with first-part engagement surface 142, being greater than 90°, enables nozzle body 140 to form a complementary engagement with first part 122 and second part 124, where second part 124 has an overhang beveled flange, as nozzle body 140 translationally moves along first part 122 and second part 124.

Referring generally to FIG. 1 and particularly to, e.g., FIG. 2A for illustrative purposes only and not by way of limitation, the following portion of this paragraph delineates example 21 of the subject matter, disclosed herein. According to example 21, which encompasses any one of examples 1 to 20, above, separator plate 114 comprises fixed-end portion 127 and free-end portion 129. Fixed-end portion 127 is fixed to nozzle body 140. Free-end portion 129 is located away from nozzle body 140. Free-end portion 129 comprises curvilinear edge 174.

Curvilinear edge 174 of free-end portion 129 of separator plate 114 facilitates insertion of separator plate 114 into space 104 between first part 122 and second part 124 by reducing binding between separator plate 114, and first part 122 and second part 124.

Referring generally to FIG. 1 and particularly to, e.g., FIGS. 2A-2O for illustrative purposes only and not by way of limitation, the following portion of this paragraph delineates example 22 of the subject matter, disclosed herein. According to example 22, system 101 for dispensing adhesive 102 between first part 122 and second part 124 comprises nozzle 100. Nozzle 100 comprises nozzle body 140, comprising first-part engagement surface 142 and second-part engagement surface 144, which is contiguous with first-part engagement surface 142 and defines engagement-surface angle θ, greater than 0° and less than 180°, with a virtual plane, coincident with first-part engagement surface 142. Nozzle body 140 additionally comprises nozzle-body outlet port 116, formed in second-part engagement surface 144, and nozzle-body inlet port 132, formed in first-part engagement surface 142. Nozzle 100 also comprises separator plate 114, coupled with and extending from nozzle body 140. System 101 also comprises reservoir 125, fluidically coupled with nozzle-body outlet port 116, and vacuum source 126, fluidically coupled with nozzle-body inlet port 132. System 101 additionally comprises vehicle 110, supporting nozzle 100.

System 101 facilitates the dispensing of adhesive 102 between first part 122 and second part 124 in a fast and efficient manner. Nozzle 100 provides for depositing adhesive 102, through nozzle-body outlet port 116, into a space (e.g., space 104) between first part 122 and second part 124, and promoting uniform distribution of adhesive 102 in space 104 by receiving a portion of adhesive 102 into nozzle-body inlet port 132. Receiving the portion of adhesive 102 into nozzle-body inlet port 132 enables uniform distribution of adhesive 102 throughout space 104 by promoting flow of adhesive 102 between first part 122 and second part 124. Additionally, nozzle-body outlet port 116 and nozzle-body inlet port 132, being on nozzle body 140, help reduce buildup of excess of adhesive 102 outside of space 104 without the need for another nozzle. Separator plate 114 promotes separation between first part 122 and second part 124 to create space 104. Nozzle-body outlet port 116 and separator plate 114 enable adhesive 102 to be deposited, through nozzle-body outlet port 116, into space 104 when separator plate 114 is located between and is separating first part 122 and second part 124. Accordingly, a configuration of nozzle-body outlet port 116 and separator plate 114 maintains separation between first part 122 and second part 124 as adhesive 102 is deposited, through nozzle-body outlet port 116, between first part 122 and second part 124. In contrast, nozzle-body inlet port 132 and separator plate 114 enable excess portions of adhesive 102, deposited from nozzle-body outlet port 116 and collected outside of space 104, to be urged (e.g., drawn via a suction force) into nozzle-body inlet port 132 when separator plate 114 is located between and is separating first part 122 and second part 124. Accordingly, a configuration of nozzle-body inlet port 132 and separator plate 114B maintains separation between first part 122 and second part 124 as excess portions of adhesive 102, accumulating outside of space 104, are urged away from first part 122 and second part 124 through nozzle-body inlet port 132. Second-part engagement surface 144, defining engagement-surface angle θ, greater than 0° and less than 180°, with the virtual plane, coincident with first-part engagement surface 142, enables nozzle body 140 to form a complementary engagement with first part 122 and second part 124 as nozzle body 140 translationally moves along first part 122 and second part 124. Vehicle 110 enables movement of nozzle 100 relative to first part 122 and second part 124 for insertion of separator plate 114 between first part 122 and second part 124 and for depositing adhesive 102 between and along first part 122 and second part 124.

In some examples, nozzle 100 is fluidically coupled with reservoir 125 and vacuum source 126 via respective tubes, which are flexible, in some examples. Flexible tubes enable nozzle 100 to move relative to reservoir 125 and vacuum source 126, respectively. Reservoir 125 enables adhesive 102 to be dispensed from nozzle-body outlet port 116. Vacuum source 126 enables adhesive 102 to be received in nozzle-body inlet port 132. Referring to FIGS. 2B and 2C, nozzle body 140 further comprises third nozzle-body inlet port 118A and first nozzle-body channel 121A. First nozzle-body channel 121A extends through nozzle body 140 and fluidically couples together third nozzle-body inlet port 118A and nozzle-body outlet port 116, such that adhesive 102 from reservoir 125 flows into third nozzle-body inlet port 118A, through first nozzle-body channel 121A, and to nozzle-body outlet port 116. Referring again to FIGS. 2B and 2C, nozzle body 140 further comprises second nozzle-body outlet port 118B and second nozzle-body channel 121B. Second nozzle-body channel 121B extends through nozzle body 140 and fluidically couples together second nozzle-body outlet port 118B and nozzle-body inlet port 132, such that an overfill portion of adhesive 102, from between first part 122 and second part 124, flows into nozzle-body inlet port 132, through second nozzle-body channel 121B, and to second nozzle-body outlet port 118B. Although shown as a single unit in FIGS. 2A, 6-9, and 15-18, in one or more examples, reservoir 125 includes multiple units. Similarly, although shown as a single unit in FIGS. 2A, 6-9, 15-18, in one or more examples, vacuum source 126 includes multiple units. Reservoir 125 provides a source of adhesive 102 and includes a pump, in certain examples.

Referring again to FIGS. 2B and 2C, in some examples, nozzle body 140 further comprises third nozzle-body outlet port 119B and third nozzle-body channel 123B. Third nozzle-body channel 123B extends through nozzle body 140 and fluidically couples together third nozzle-body outlet port 119B and second nozzle-body inlet port 134, such that an overfill portion of adhesive 102, from between first part 122 and second part 124, flows into second nozzle-body inlet port 134, through third nozzle-body channel 123B, and to third nozzle-body outlet port 119B.

Figure 4:
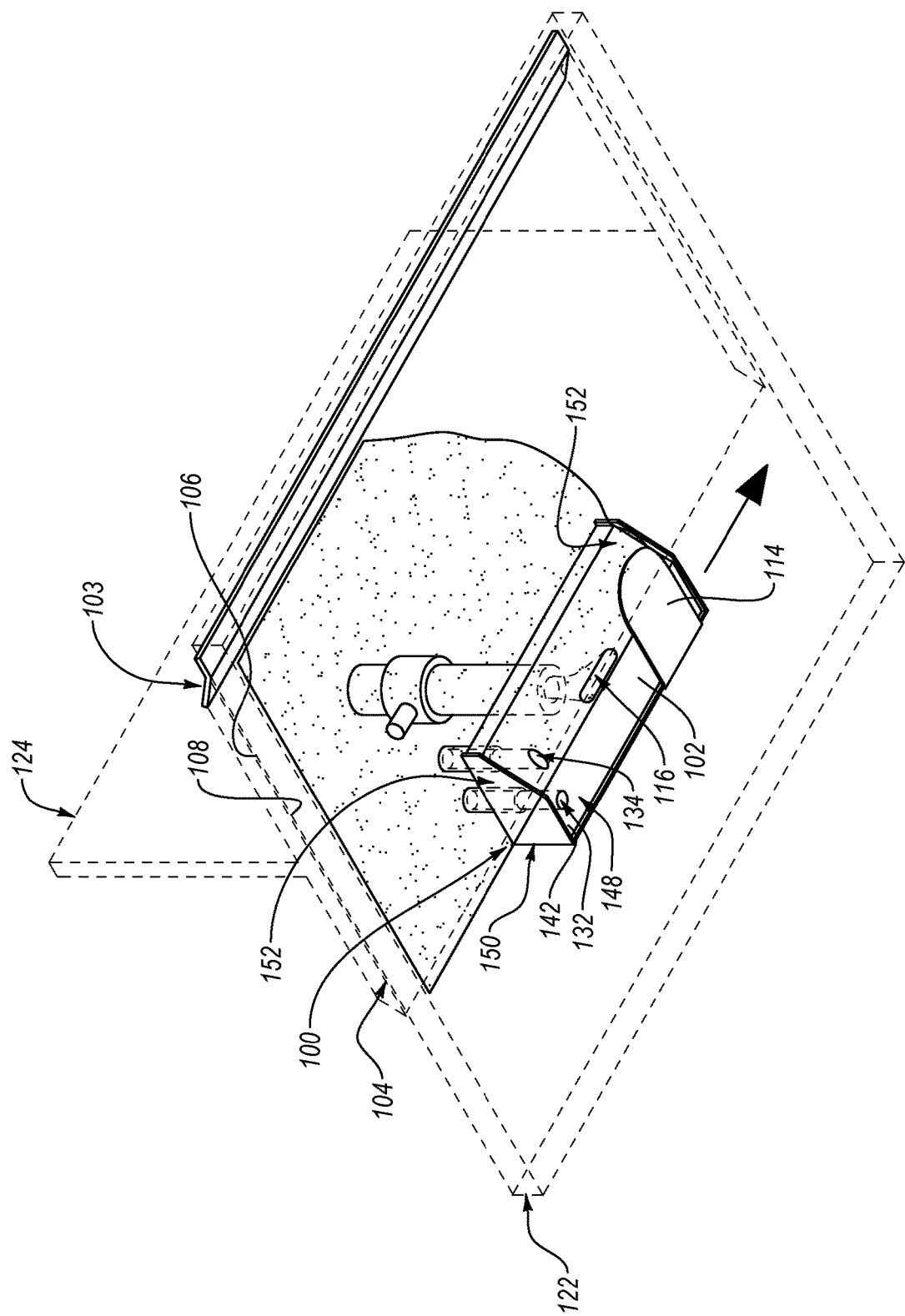
FIG. 4 is a schematic, perspective view of a nozzle of the system of FIG. 1, according to one or more examples of the subject matter, disclosed herein.
Figure 5:
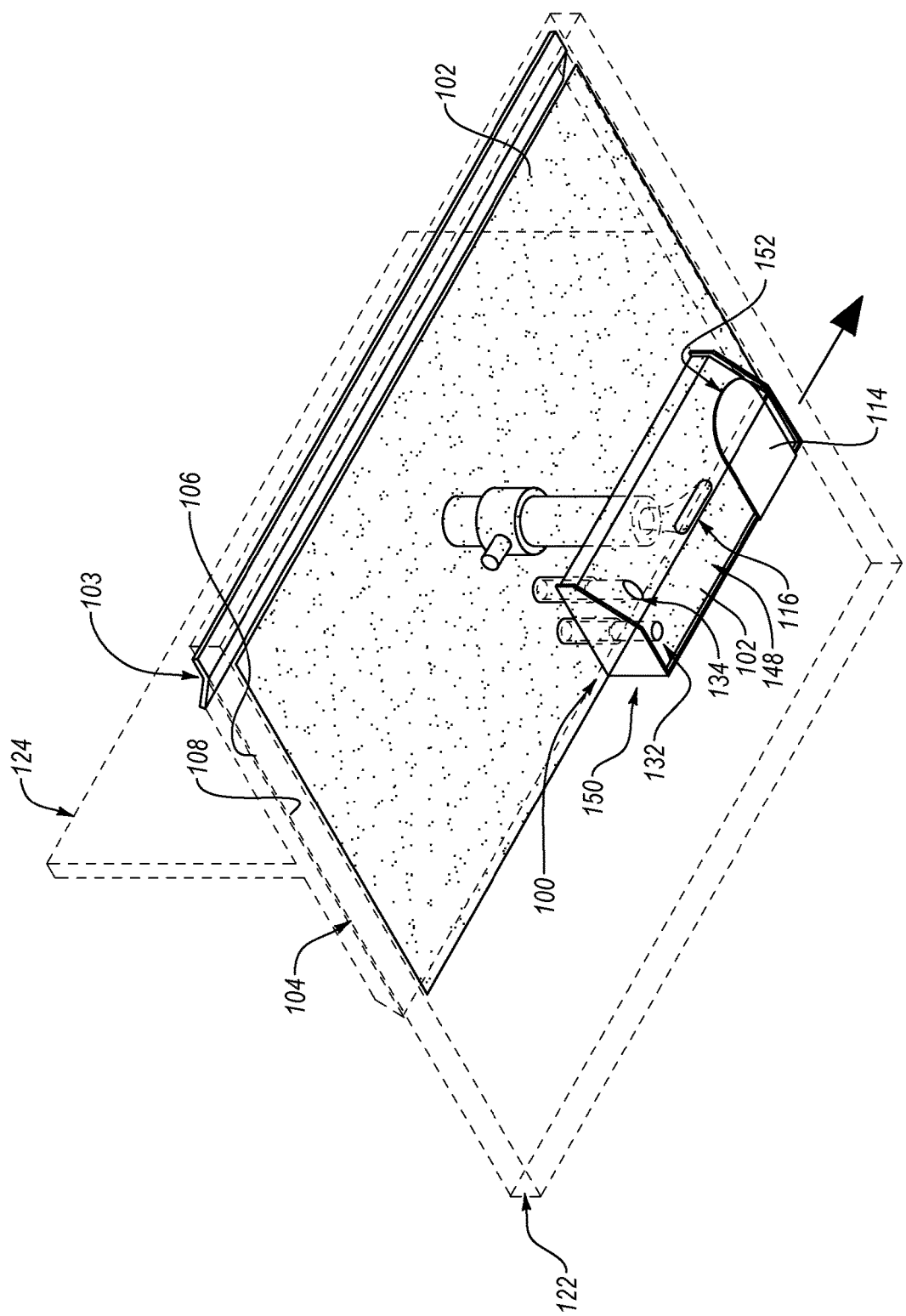
FIG. 5 is a schematic, perspective view of a nozzle of the system of FIG. 1, according to one or more examples of the subject matter, disclosed herein.
Figure 6:
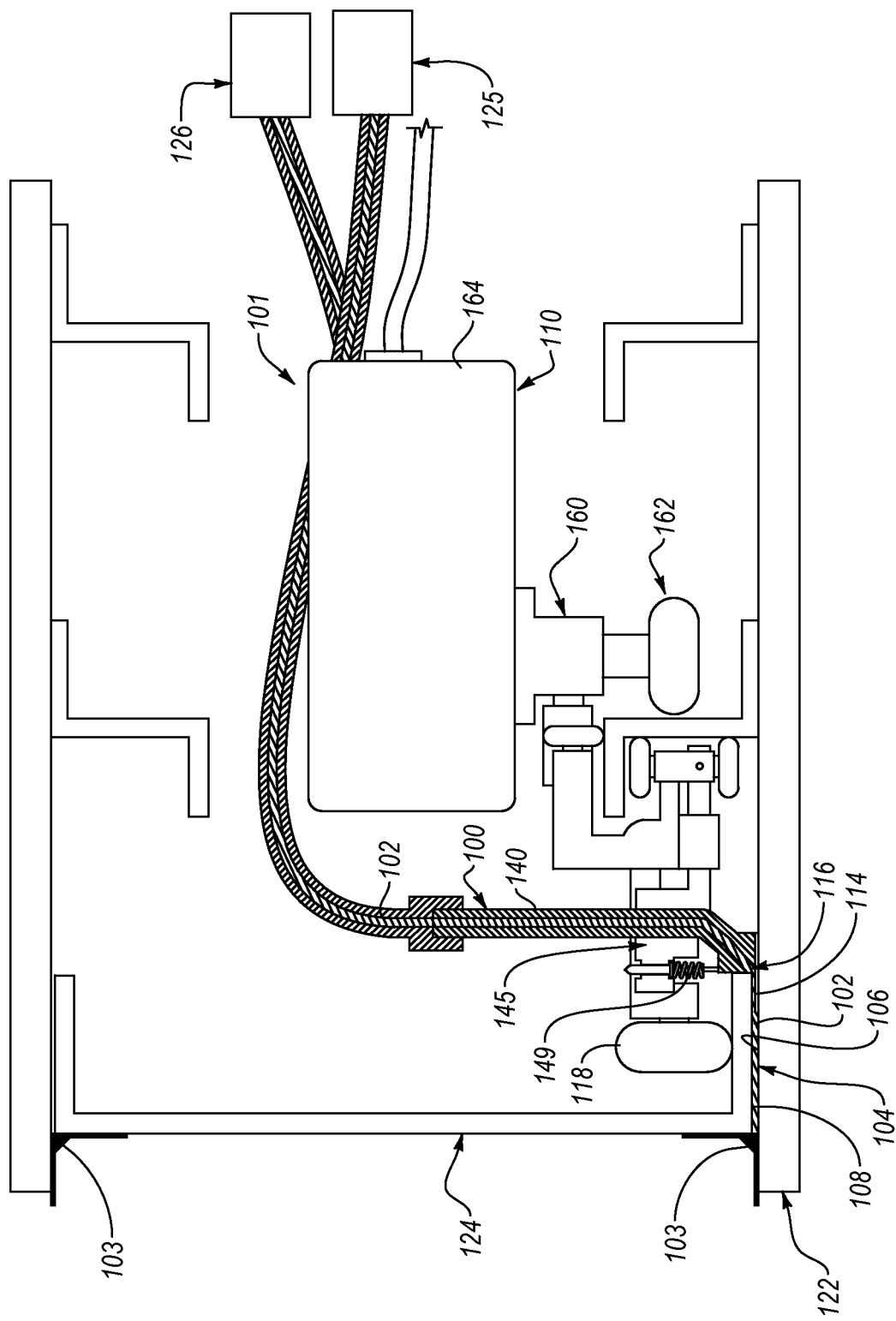
FIG. 6 is a schematic, elevation, sectional view of the system of FIG. 1, according to one or more examples of the subject matter, disclosed herein.
Figure 7:
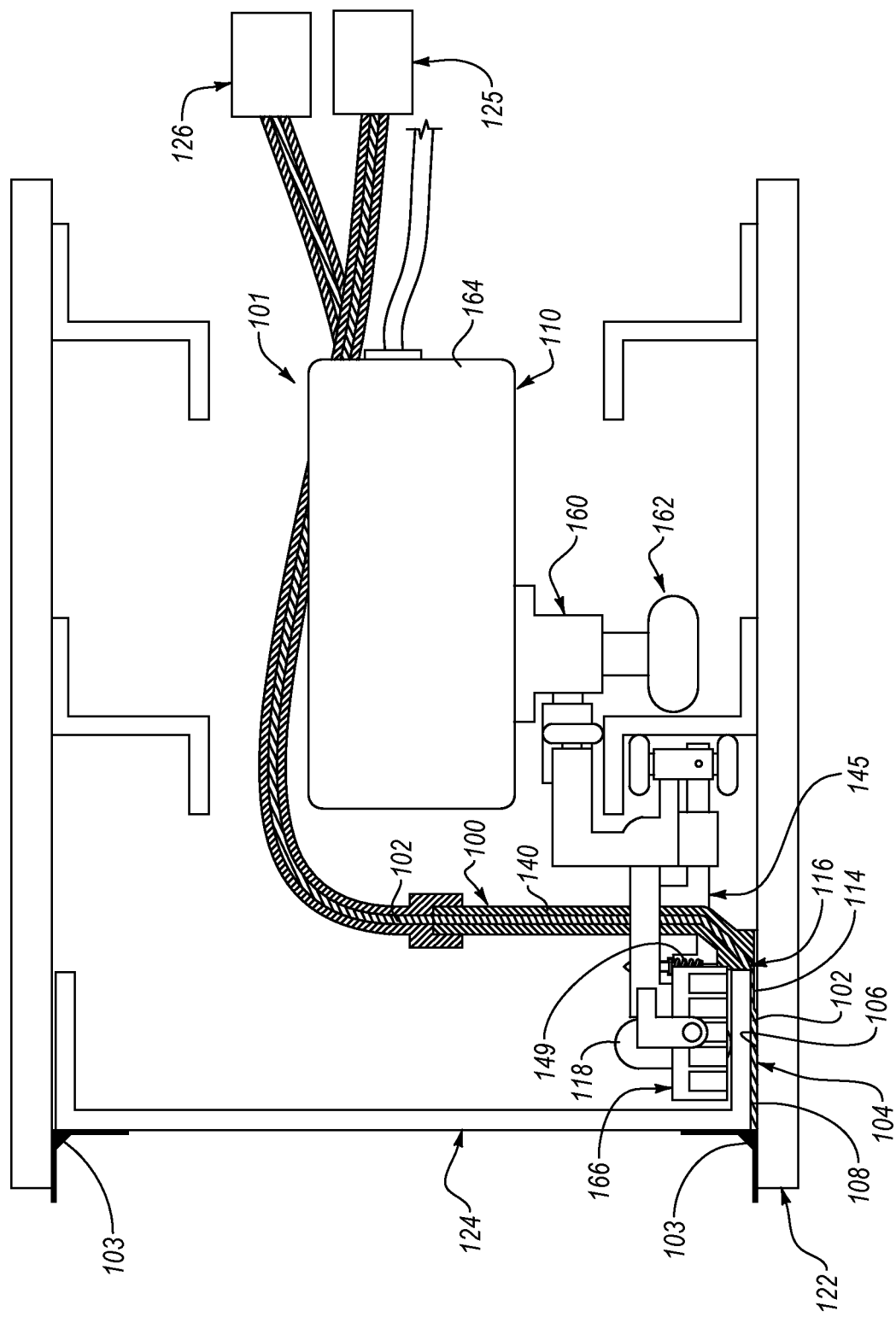
FIG. 7 is a schematic, elevation, sectional view of the system of FIG. 1, according to one or more examples of the subject matter, disclosed herein.
Figure 8:
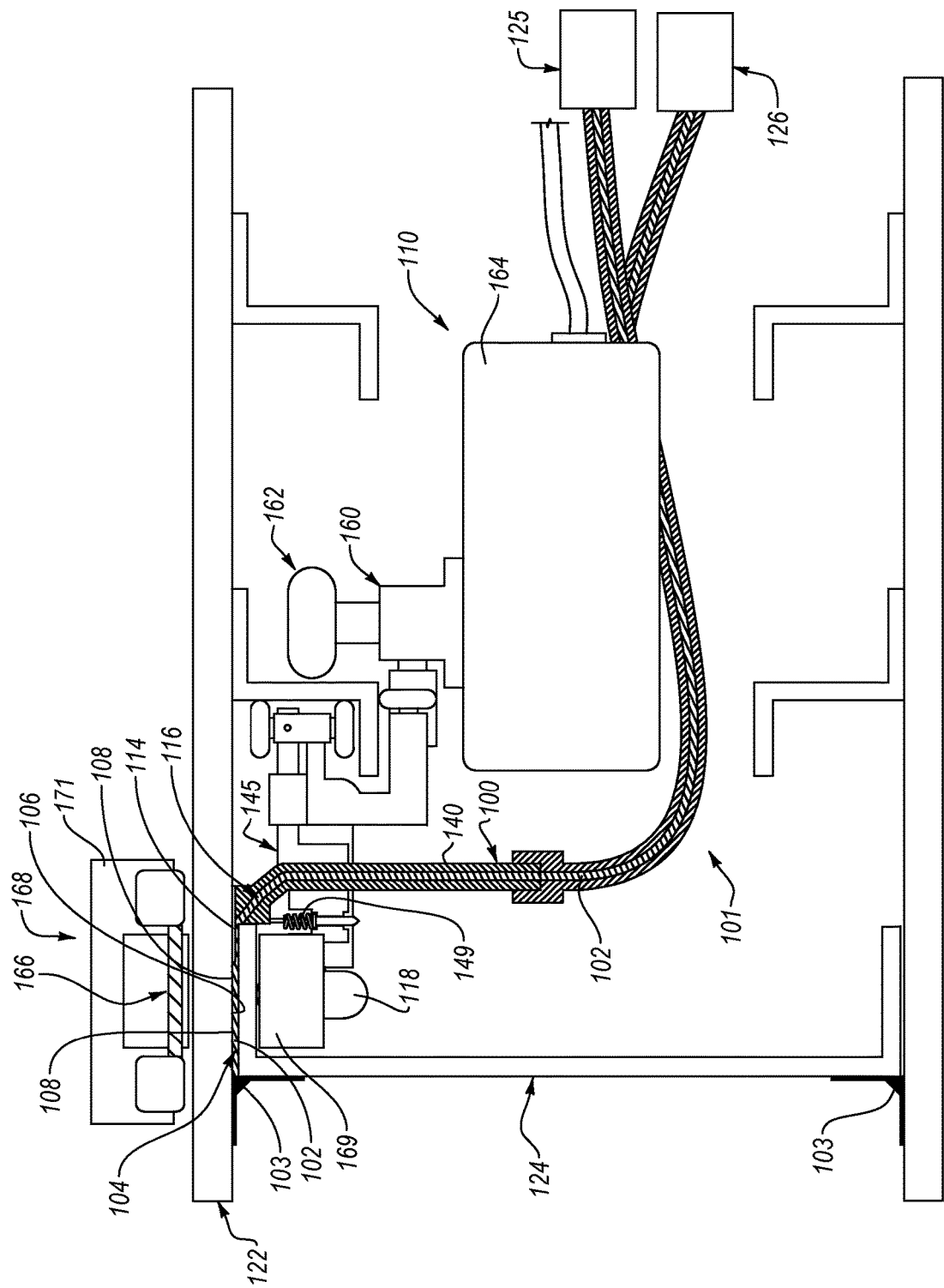
FIG. 8 is a schematic, elevation, sectional view of the system of FIG. 1, according to one or more examples of the subject matter, disclosed herein.

Nozzle 100, comprising nozzle-body outlet port 116 and nozzle-body inlet port 132, enables dispensing of adhesive 102 and removal of excess portions of adhesive 102 from same side of second part 124. Accordingly, a second nozzle on an opposite side of second part 124 is not necessary. However, as shown in FIGS. 3-20, in some examples, to help prevent adhesive 102, dispensed into space 104 between first part 122 and second part 124 at a first side of second part 124, from leaking out of space 104 at a second side of second part 124, which is opposite the first side of second part 124, system 101 further comprises sealing tape 103. Sealing tape 103 can be applied onto first part 122 and second part 124, on the second side of part 124, to seal space 104 along the second side of part 124. Accordingly, as shown in FIGS. 4 and 5, as adhesive 102 fills space 104 between first part 122 and second part 124, sealing tape 103 retains adhesive 102 in space 104. In some examples, sealing tape 103 includes any of various adhesive tapes.

Referring generally to FIG. 1 and particularly to, e.g., FIGS. 6-9 for illustrative purposes only and not by way of limitation, the following portion of this paragraph delineates example 23 of the subject matter, disclosed herein. According to example 23, which encompasses example 22, above, vehicle 110 comprises crawler 160 that is selectively movable relative to reservoir 125 and vacuum source 126. Nozzle 100 is coupled to crawler 160 such that movement of crawler 160, relative to reservoir 125 and vacuum source 126, correspondingly moves nozzle 100 relative to reservoir 125 and vacuum source 126.

Crawler 160 enables automated movement of nozzle 100 relative to first part 122 and second part 124. Crawler 160 interacts with environment to fix crawler 160 relative to first part 122 and second part 124 such that crawler 160 selectively moves relative to first part 122 and second part 124.

Referring generally to FIG. 1 and particularly to, e.g., FIGS. 6-9 for illustrative purposes only and not by way of limitation, the following portion of this paragraph delineates example 24 of the subject matter, disclosed herein. According to example 24, which encompasses example 23, above, crawler 160 comprises wheels 162 and motor 164, coupled to at least one of wheels 162 and selectively operable to rotate at least the one of wheels 162.

Wheels 162 of crawler 160 enable crawler 160 to fix to environmental structures near first part 122 and second part 124 and roll along the environmental structures, such that nozzle 100 moves relative to first part 122 and second part 124. In some examples, wheels 162 include at least one actuatable wheel that is actuatable to clamp an environmental structure between the at least one actuatable wheel and another actuatable or non-actuatable wheel. Motor 164 facilitates movement of crawler 160, relative to first part 122 and second part 124, by driving at least the one of wheels 162. Motor 164 can be any of various selectively operable motors, such as electric motors, hydraulic motors, magnetic motors, pneumatic motors, and the like.

Referring generally to FIG. 1 and particularly to, e.g., FIGS. 10-14 for illustrative purposes only and not by way of limitation, the following portion of this paragraph delineates example 25 of the subject matter, disclosed herein. According to example 25, which encompasses example 22, above, vehicle 110 comprises robotic arm 170. Nozzle 100 is coupled to robotic arm 170. Robotic arm 170 is configured to move nozzle 100 relative to reservoir 125 and vacuum source 126.

Robotic arm 170 enables automated movement of nozzle 100 relative to first part 122 and second part 124. Robotic arm 170 interacts with environment to selectively move nozzle 100 relative to first part 122 and second part 124. In some examples, robotic arm 170 is any of various programmable robotic arm mechanisms, such as 6-axis robots with articulating arm segments.

Referring generally to FIG. 1 and particularly to, e.g., FIGS. 15-18 for illustrative purposes only and not by way of limitation, the following portion of this paragraph delineates example 26 of the subject matter, disclosed herein. According to example 26, which encompasses example 22, above, vehicle 110 comprises handle 180 that is manually movable relative to reservoir 125 and vacuum source 126. Nozzle 100 is coupled to handle 180.

Handle 180 enables manual movement of nozzle 100 relative to first part 122 and second part 124. In some examples, handle 180 includes a rigid rod and a grip, coupled to the rigid rod. A user can manually grip handle 180, at the grip, and manually move handle 180 relative to first part 122 and second part 124 to correspondingly move nozzle 100 relative to first part 122 and second part 124.

Figure 14:
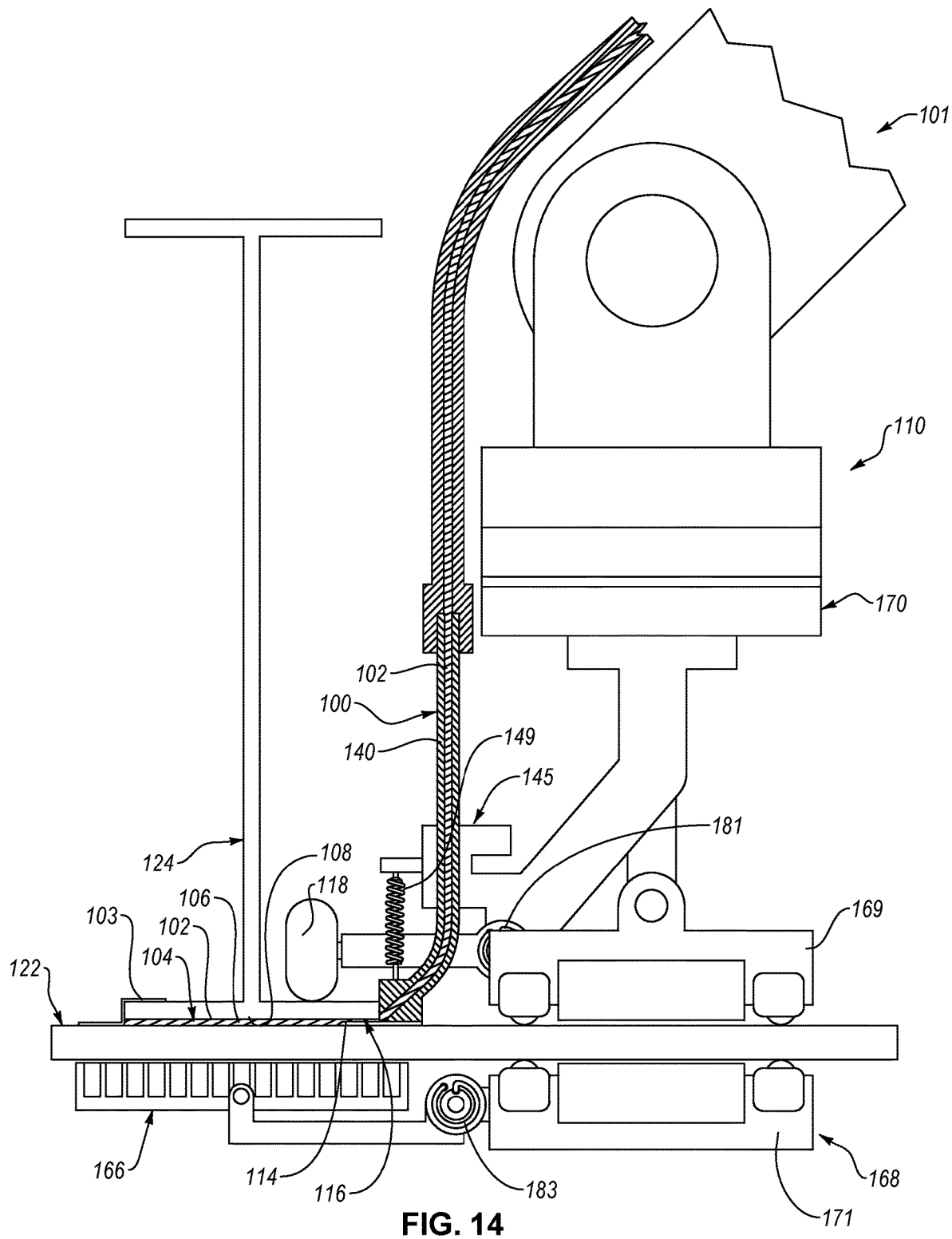
FIG. 14 is a schematic, elevation, sectional view of the system of FIG. 1, according to one or more examples of the subject matter, disclosed herein.
Figure 15:
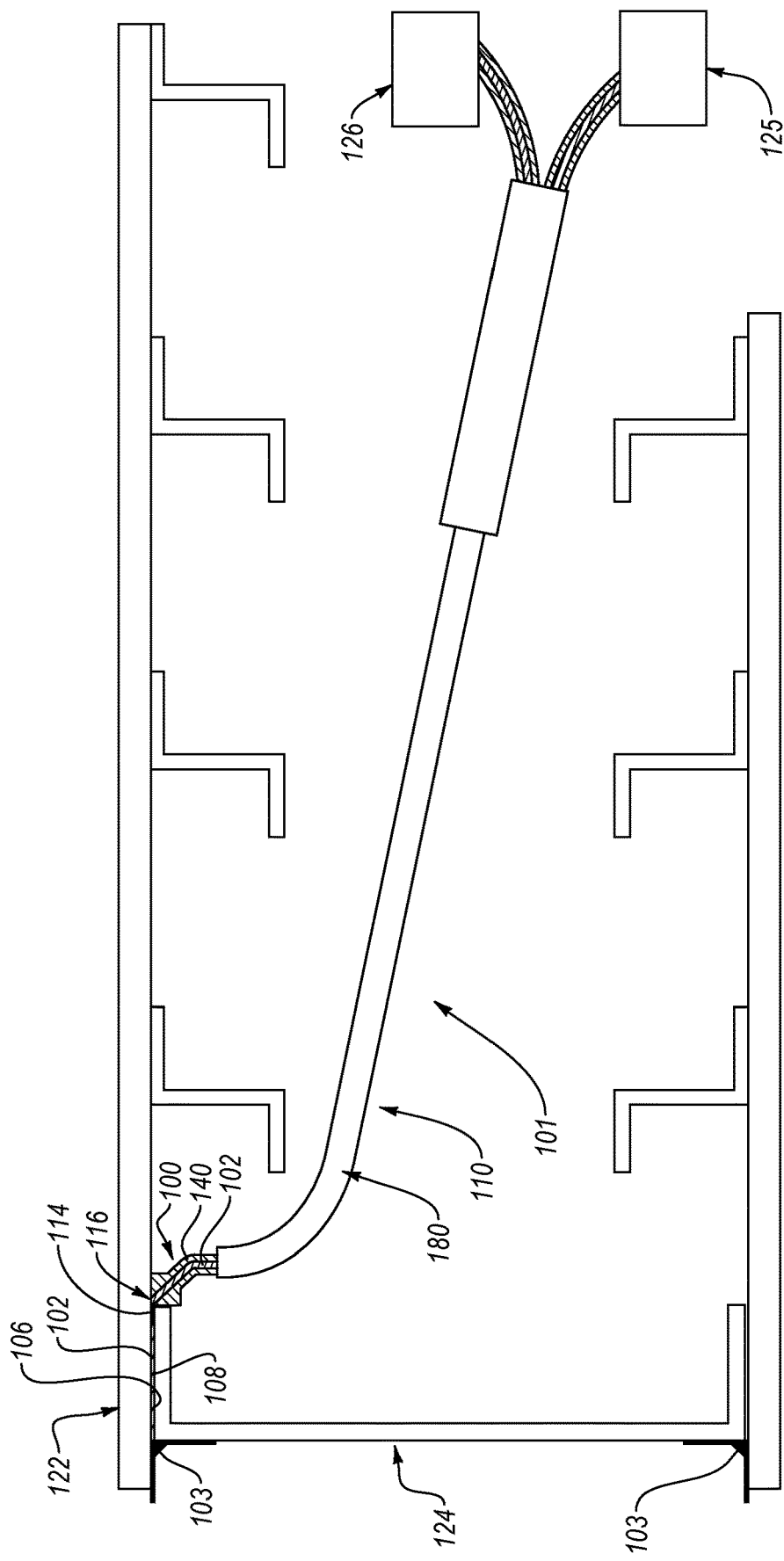
FIG. 15 is a schematic, elevation, sectional view of the system of FIG. 1, according to one or more examples of the subject matter, disclosed herein.
Figure 16:
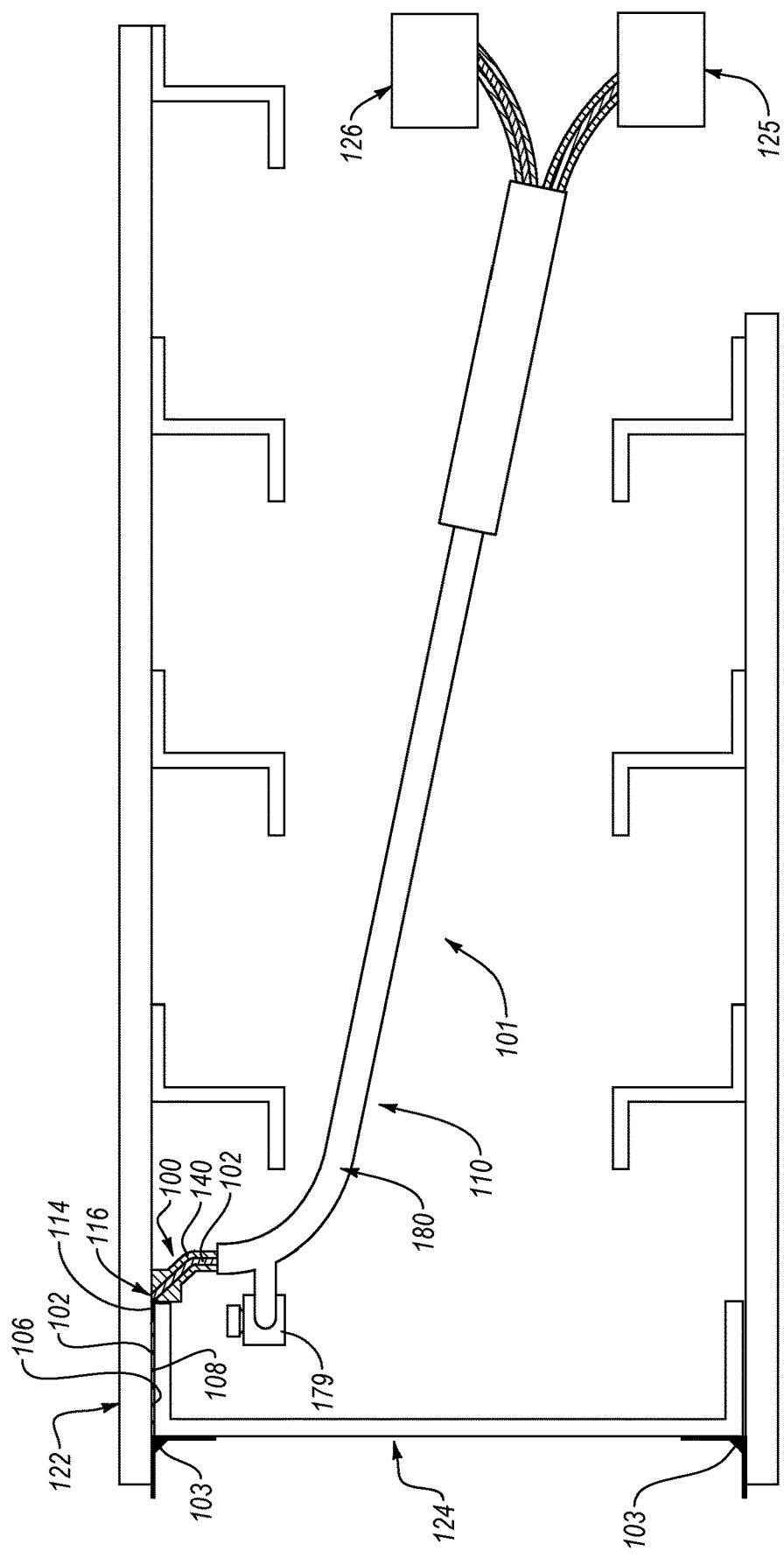
FIG. 16 is a schematic, elevation, sectional view of the system of FIG. 1, according to one or more examples of the subject matter, disclosed herein.

Referring generally to FIG. 1 and particularly to, e.g., FIG. 14 for illustrative purposes only and not by way of limitation, the following portion of this paragraph delineates example 27 of the subject matter, disclosed herein. According to example 27, which encompasses example 22, above, vehicle 110 comprises articulated structure 190, comprising segments 192. Adjacent ones of segments 192 are coupled to each other, such that the adjacent ones of segments 192 are pivotable, relative to each other, about first axis 193 and second axis 195. First axis 193 is perpendicular to second axis 195.

Articulated structure 190 enables automated movement of nozzle 100 relative to first part 122 and second part 124. Articulated structure 190 interacts with environment to selectively move nozzle 100 relative to first part 122 and second part 124. In some examples, articulated structure 190 is configured to be fixed to (e.g., clamp to) environmental structure near first part 122 and second part 124. Adjacent ones of segments 192, being pivotable, relative to each other, about first axis 193 and second axis 195, promote freedom of movement of nozzle 100 relative to first part 122 and second part 124, while enabling articulated structure 190 to position nozzle 100 in areas that are difficult to reach.

Referring generally to FIG. 1 and particularly to, e.g., FIGS. 7, 8, 13, 14, 18, and 20 for illustrative purposes only and not by way of limitation, the following portion of this paragraph delineates example 28 of the subject matter, disclosed herein. According to example 28, which encompasses any one of examples 22 to 27, above, system 101 further comprises sensor 166, coupled to vehicle 110 and movable relative to nozzle 100.

Sensor 166 provides for detection of adhesive 102 between first part 122 and second part 124. Detection of adhesive between first part 122 and second part 124 by sensor 166 enables adjustments to the operation of system 101 and nozzle 100 that promote the speed and efficiency at which adhesive 102 is delivered into space 104 between first part 122 and second part 124 and the distribution uniformity of adhesive 102, delivered into space 104. Sensor 166 is any of various types of sensors configured to detect presence of adhesive 102 between first part 122 and second part 124. In some examples, sensor 166 is one or more of an ultrasonic sensor array, an optical sensor, a pressure sensor, an infrared sensor, a motion sensor, and the like.

Referring generally to FIG. 1 and particularly to, e.g., FIGS. 8, 9, 12, 14, and 17 for illustrative purposes only and not by way of limitation, the following portion of this paragraph delineates example 29 of the subject matter, disclosed herein. According to example 29, which encompasses any one of examples 22 to 27, above, system 101 further comprises magnetic coupling assembly 168, coupled to vehicle 110. Magnetic coupling assembly 168 comprises first magnetic coupler 169, attached to vehicle 110, and second magnetic coupler 171, magnetically coupleable to first magnetic coupler 169. System 101 also comprises sensor 166, attached to second magnetic coupler 171.

Magnetic coupling assembly 168 enables presence of adhesive 102 between first part 122 and second part 124 to be detected by sensor 166 from the side of first part 122 that is opposite the side second part 124 is on. Such a configuration is helpful when access to first part 122 and second part 124 is difficult from the side of first part 122 that second part 124 is on.

Referring generally to FIG. 1 and particularly to, e.g., FIGS. 14, for illustrative purposes only and not by way of limitation, the following portion of this paragraph delineates example 30 of the subject matter, disclosed herein. According to example 30, which encompasses example 29, above, second magnetic coupler 171 comprises sensor-biasing spring 183, coupled to sensor 166 and configured to bias sensor 166 toward first magnetic coupler 169.

Sensor-biasing spring 183 helps to urge sensor 166 into a location, relative to first part 122, suited for detection of presence of adhesive 102 between first part 122 and second part 124. In some examples, sensor-biasing spring 183 is a torsion spring.

Figure 9:
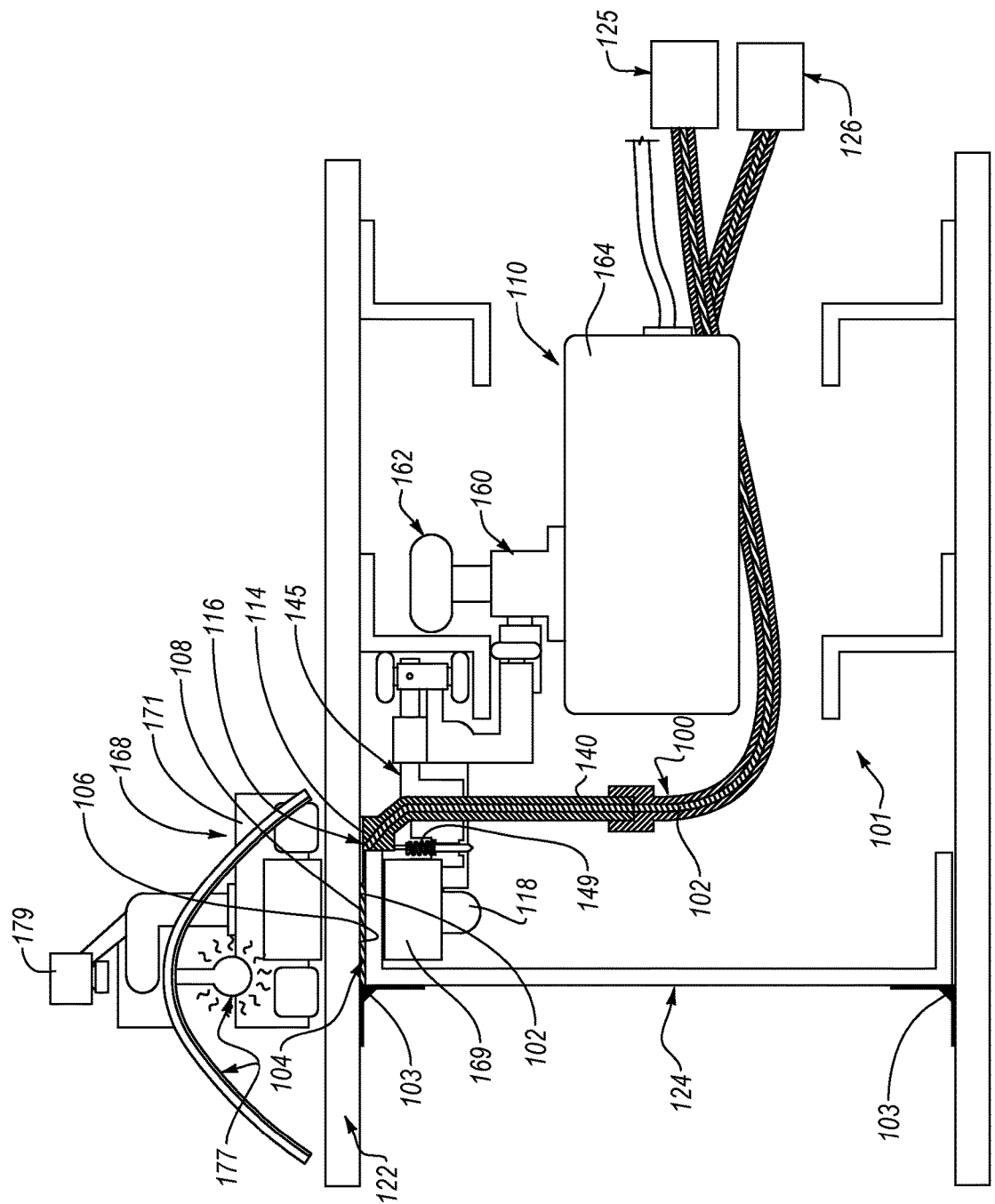
FIG. 9 is a schematic, elevation, sectional view of the system of FIG. 1, according to one or more examples of the subject matter, disclosed herein.
Figure 10:
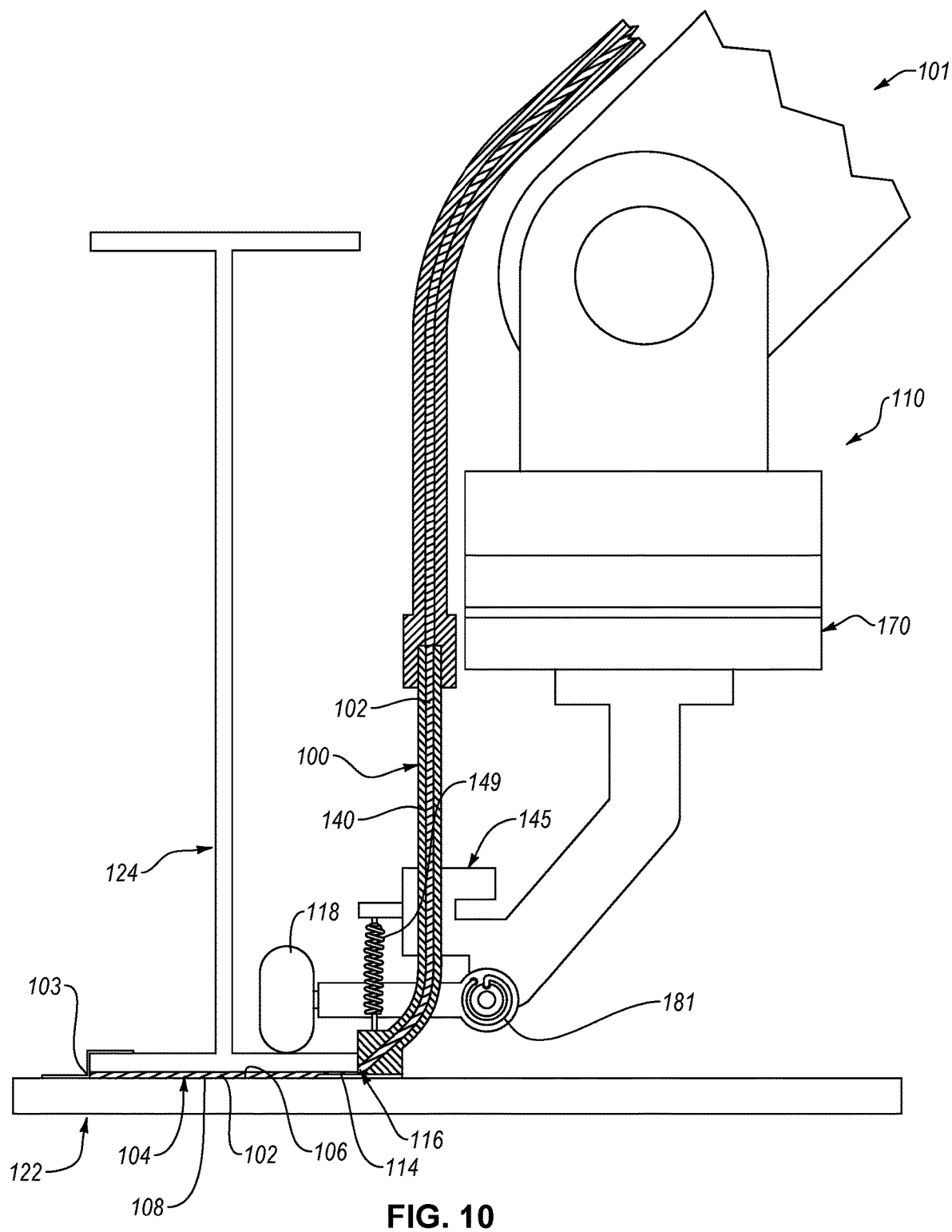
FIG. 10 is a schematic, elevation, sectional view of the system of FIG. 1, according to one or more examples of the subject matter, disclosed herein.
Figure 11:
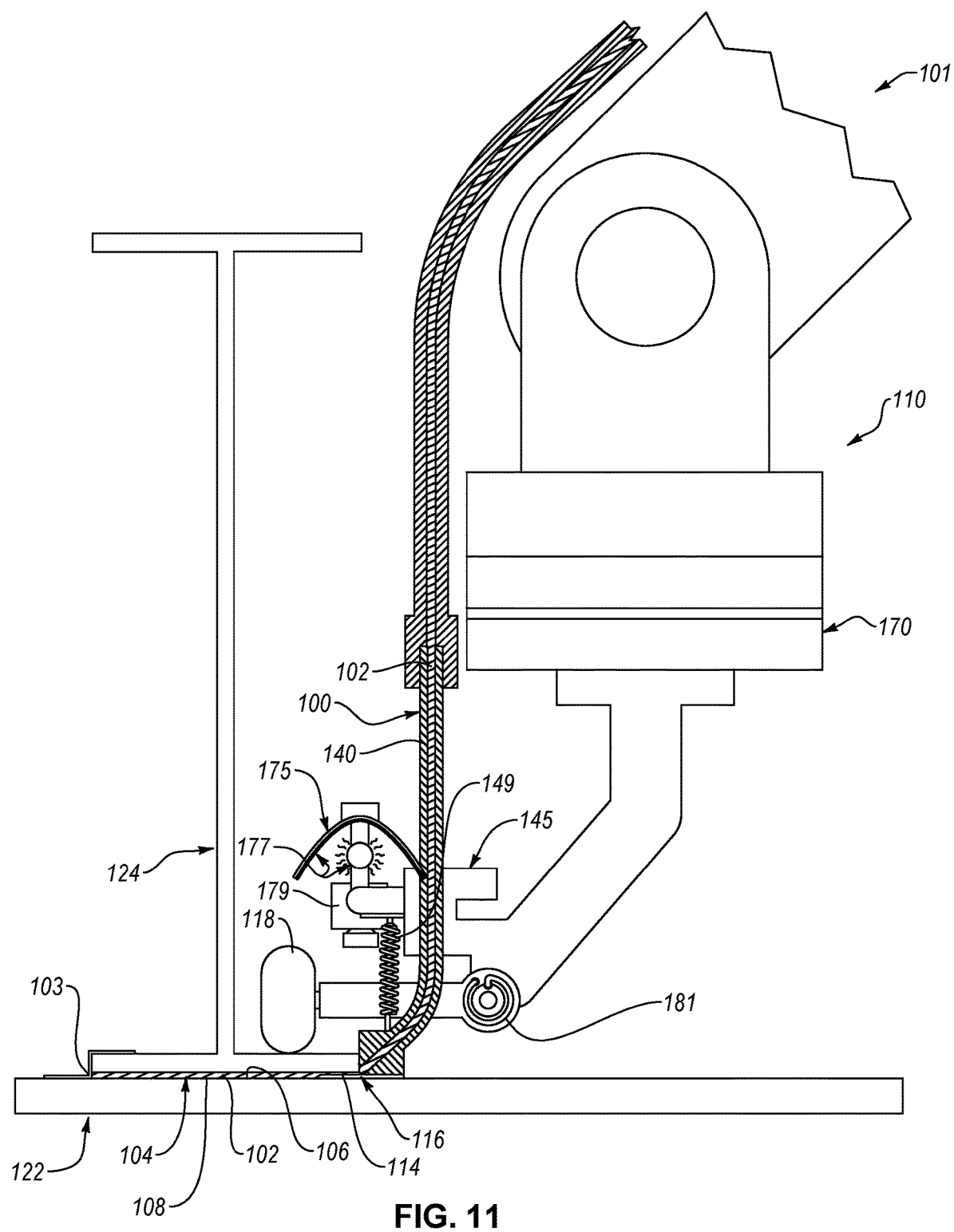
FIG. 11 is a schematic, elevation, sectional view of the system of FIG. 1, according to one or more examples of the subject matter, disclosed herein.
Figure 12:
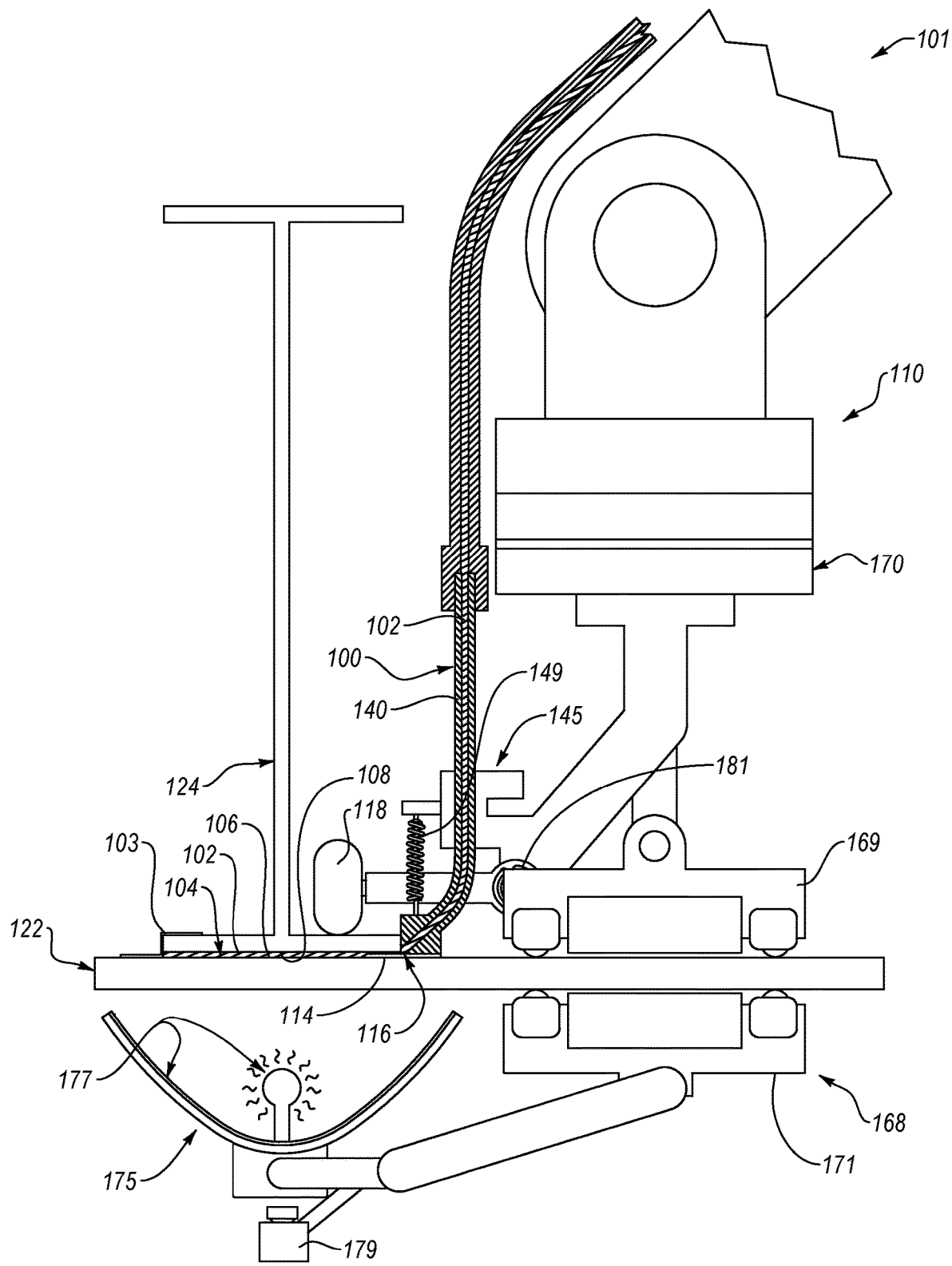
FIG. 12 is a schematic, elevation, sectional view of the system of FIG. 1, according to one or more examples of the subject matter, disclosed herein.
Figure 13:
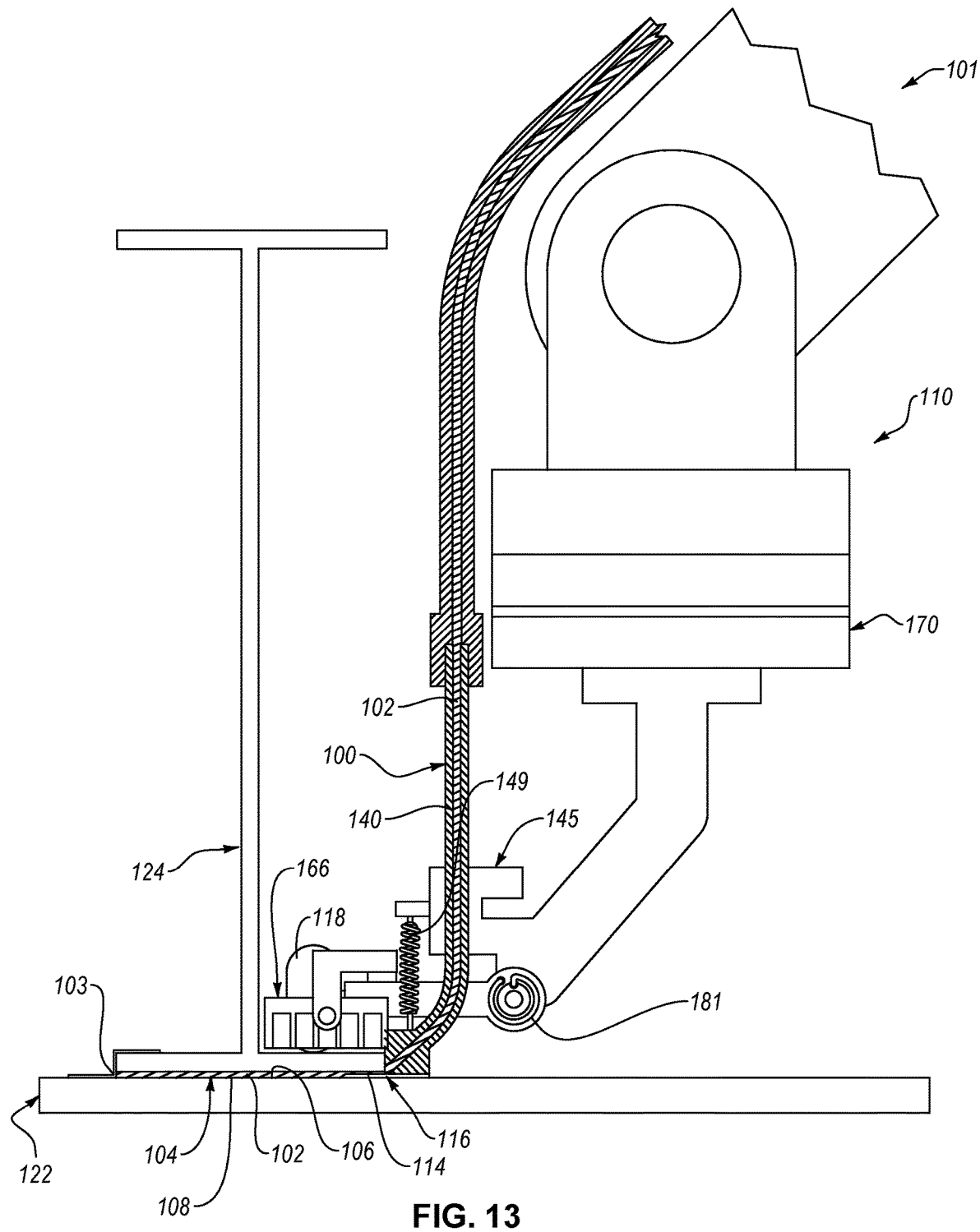
FIG. 13 is a schematic, elevation, sectional view of the system of FIG. 1, according to one or more examples of the subject matter, disclosed herein.
Figure 17:
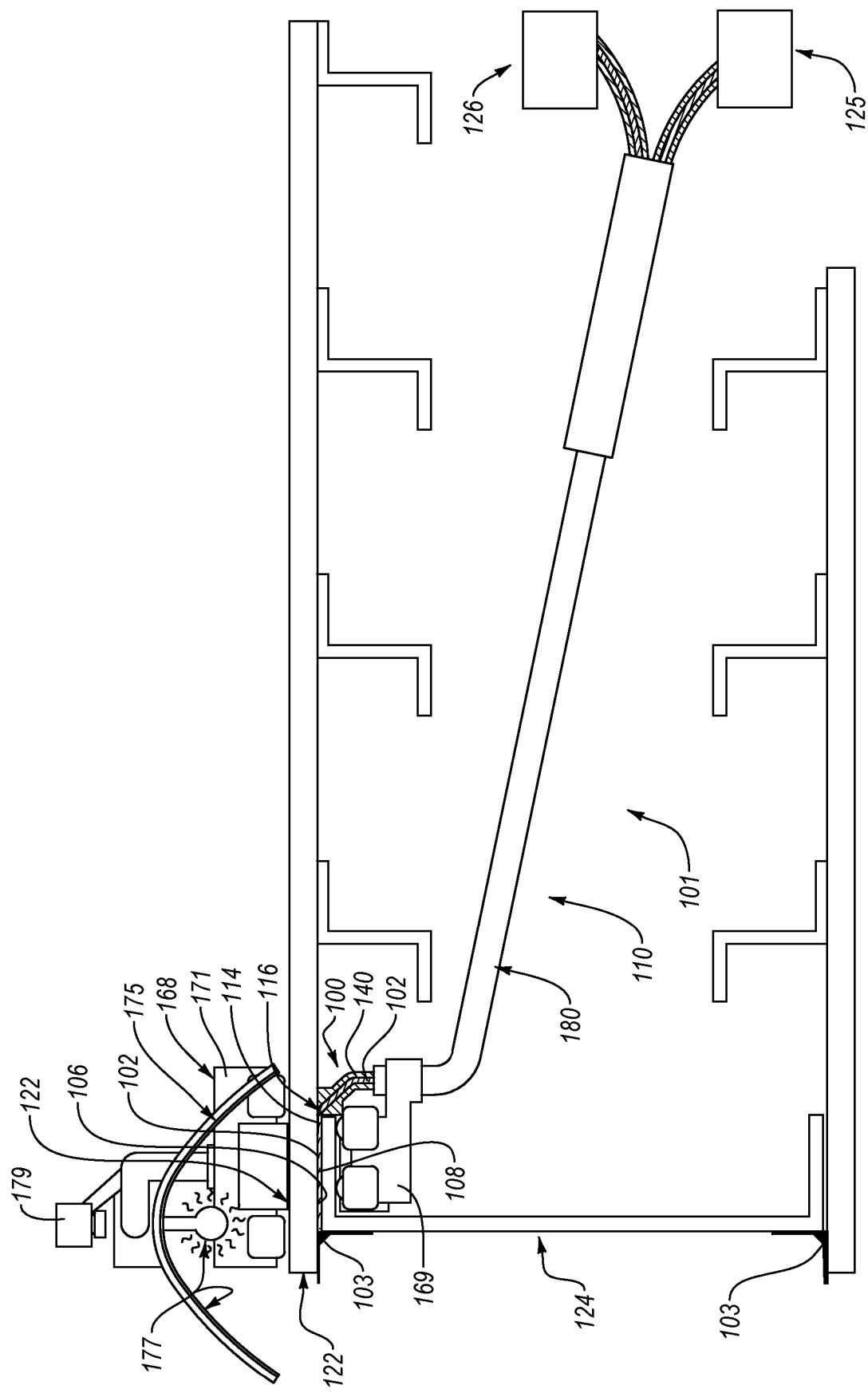
FIG. 17 is a schematic, elevation, sectional view of the system of FIG. 1, according to one or more examples of the subject matter, disclosed herein.
Figure 18:
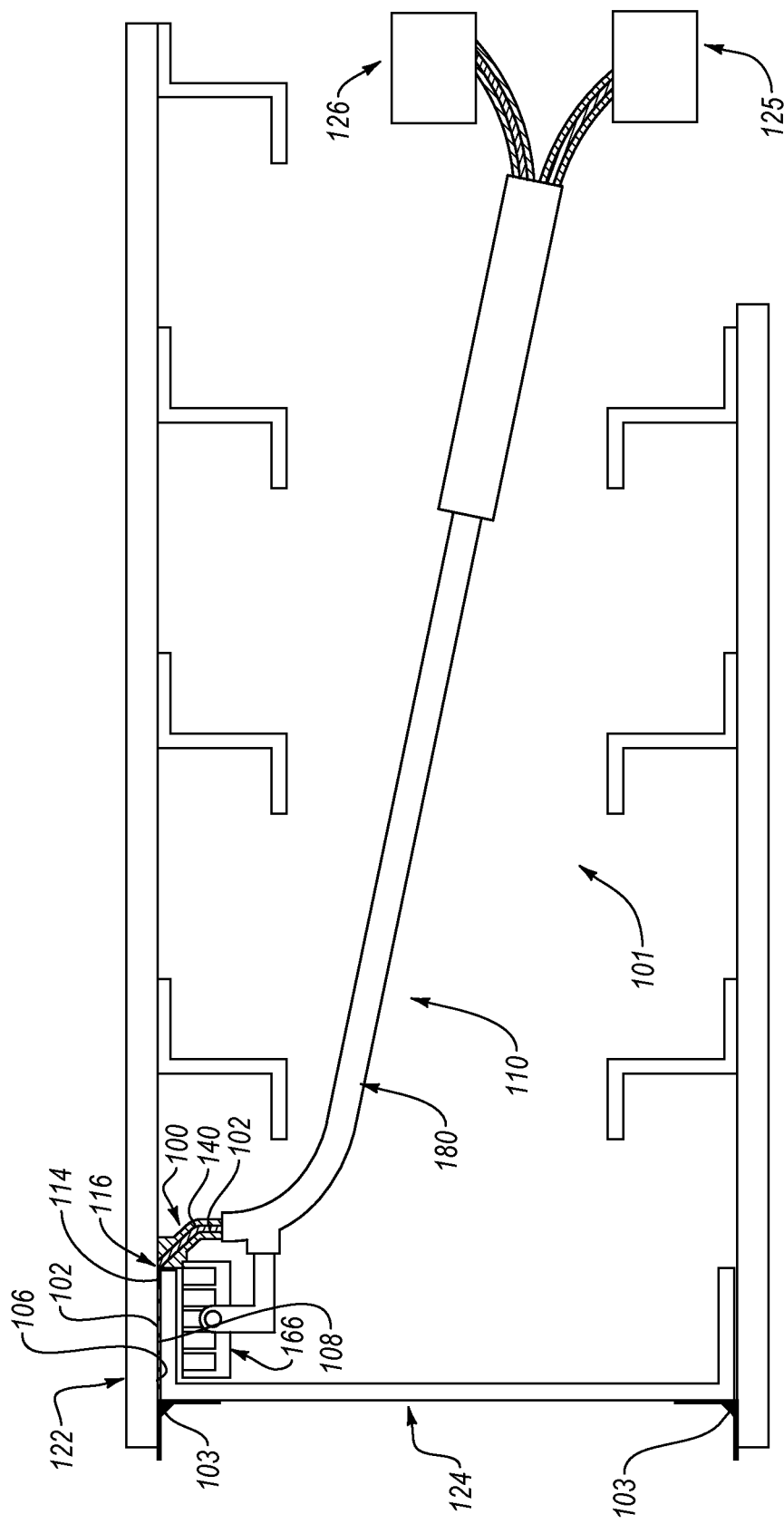
FIG. 18 is a schematic, elevation, sectional view of the system of FIG. 1, according to one or more examples of the subject matter, disclosed herein.

Referring generally to FIG. 1 and particularly to, e.g., FIGS. 9, 12, and 17 for illustrative purposes only and not by way of limitation, the following portion of this paragraph delineates example 31 of the subject matter, disclosed herein. According to example 31, which encompasses any one of examples 22 to 27, above, system 101 further comprises magnetic coupling assembly 168, coupled to vehicle 110. Magnetic coupling assembly 168 comprises first magnetic coupler 169, attached to vehicle 110, and second magnetic coupler 171, magnetically coupleable to first magnetic coupler 169. System 101 also comprises heat source 175, attached to second magnetic coupler 171. System 101 additionally comprises infrared camera 179, attached to second magnetic coupler 171, such that infrared camera 179 is stationary relative to heat source 175.

Heat source 175 provides heat 177 for heating adhesive 102 just prior to being delivered from first-nozzle-body outlet port 116A into space 104 between first part 122 and second part 124, and after adhesive 102 is received into nozzle-body inlet port 132. Heating adhesive 102 increases the temperature of adhesive 102, which improves flowability of adhesive 102 through space 104 between first part 122 and second part 124. Infrared camera 179 enables detection of the presence of adhesive 102. Heating of adhesive 102 promotes a higher thermal energy contrast between space 104 with adhesive 102 and without adhesive 102, which improves the accuracy of detection of the presence of adhesive 102 by infrared camera 186.

Referring generally to FIG. 1 and particularly to, e.g., FIGS. 6-14 for illustrative purposes only and not by way of limitation, the following portion of this paragraph delineates example 32 of the subject matter, disclosed herein. According to example 32, which encompasses any one of examples 22 to 25, above, vehicle 110 comprises roller 118, rotatable relative to nozzle 100.

Roller 118 helps prevent movement of second part 124 away from first part 122 beyond a predetermined distance when adhesive 102 is being dispensed between first part 122 and second part 124. Accordingly, roller 118 provides a force, directed toward first part 122, against second part 124 that counters a force, directed away from first part 122, generated by adhesive 102 filling space 104 between first part 122 and second part 124, which helps to keep a thickness of space 104, when filled, below a maximum thickness. Additionally, roller 118, being rotatable relative to nozzle 100, enables roller 118 to roll along second part 124 as nozzle 100 moves relative to first part 122 and second part 124. Roller 118 can be fixed relative to nozzle 100, such that roller 118 cannot translationally move relative to nozzle 100. Additionally, roller 118 can be rotatable about an axis that is perpendicular to the translational movement of nozzle 100 along first part 122 and second part 124.

Referring generally to FIG. 1 and particularly to, e.g., FIGS. 10-14 for illustrative purposes only and not by way of limitation, the following portion of this paragraph delineates example 33 of the subject matter, disclosed herein. According to example 33, which encompasses example 32, above, vehicle 110 further comprises roller-biasing spring 181, coupled to roller 118 and configured to bias roller 118 away from vehicle 110.

Roller-biasing spring 181 provides a biasing force to urge roller 118 into contact with second part 124. In some examples, roller-biasing spring 181 is a torsion spring.

Referring generally to FIG. 1 and particularly to, e.g., FIGS. 6-14 for illustrative purposes only and not by way of limitation, the following portion of this paragraph delineates example 34 of the subject matter, disclosed herein. According to example 34, which encompasses any one of examples 22 to 25, 32, and 33, above, system 101 further comprises biasing member 149, coupled to nozzle 100 and configured to bias separator plate 114 away from vehicle 110.

Biasing member 149, being configured to bias separator plate 114 away from vehicle 110, promotes constant engagement of separator plate 114 with first part 122, as nozzle 100 moves relative to first part 122 and second part 124, and as adhesive 102 is dispensed through nozzle-body outlet port 116 and received into nozzle-body inlet port 132. In some examples, when engaged with first part 122, separator plate 114 is flush against first part 122. In some examples, biasing member 149 is a compression spring or a tension spring.

As used herein, "to bias" means to continuously apply a force, which may or may not have a constant magnitude, but is always applied in the same direction and has a magnitude greater than zero.

In some examples, vehicle 110 includes linear slide 145 that enables and ensures only linear movement of nozzle 100 relative to vehicle 110 when biasing member 149 biases separator plate 114 (and correspondingly biases nozzle 100) away from vehicle 110. Linear slide 145 is a component, such as linear-motion bearings, that provides for smooth and low-friction motion along a single axis.

Different examples of the apparatus(es) and method(s) disclosed herein include a variety of components, features, and functionalities. It should be understood that the various examples of the apparatus(es) and method(s), disclosed herein, may include any of the components, features, and functionalities of any of the other examples of the apparatus(es) and method(s) disclosed herein in any combination.

Many modifications of examples, set forth herein, will come to mind of one skilled in the art, having the benefit of the teachings, presented in the foregoing descriptions and the associated drawings.

Therefore, it is to be understood that the subject matter, disclosed herein, is not to be limited to the specific examples illustrated and that modifications and other examples are intended to be included within the scope of the appended claims. Moreover, although the foregoing description and the associated drawings describe examples of the subject matter, disclosed herein, in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided herein.

What is claimed is:

1. A nozzle for dispensing adhesive between a first part and a second part, the nozzle comprising:
   a nozzle body, comprising:
      a first-part engagement surface;
      a second-part engagement surface, contiguous with the first-part engagement surface and defining an engagement-surface angle, greater than 0° and less than 180°, with a virtual plane, coincident with the first-part engagement surface;
      a nozzle-body outlet port, formed in the second-part engagement surface; and
      a nozzle-body inlet port, formed in the first-part engagement surface; and
   a separator plate, coupled with and extending from the nozzle body.

2. The nozzle according to claim 1, wherein the nozzle-body outlet port and the nozzle-body inlet port lie in different planes.

3. The nozzle according to claim 2, wherein the separator plate extends from the nozzle body along another virtual plane, parallel to or containing the first-part engagement surface.

4. The nozzle according to claim 3, further comprising a wiper, coupled to the nozzle body and extending away from the first-part engagement surface in a direction, perpendicular to the first-part engagement surface, wherein the wiper is more flexible than the nozzle body.

5. The nozzle according to claim 4, wherein the wiper further extends away from the second-part engagement surface in a direction, perpendicular to the second-part engagement surface.

6. The nozzle according to claim 4, further comprising an overflow pocket, defined by the wiper and the first-part engagement surface of the nozzle body, wherein the nozzle-body inlet port is in fluidic communication with the overflow pocket.

7. The nozzle according to claim 6, further comprising a secondary overflow pocket, defined by the wiper and the second-part engagement surface of the nozzle body, wherein:
   the nozzle body further comprises a second nozzle-body inlet port, formed in the second-part engagement surface; and
   the second nozzle-body inlet port is in fluidic communication with the secondary overflow pocket.

8. The nozzle according to claim 1, wherein the engagement-surface angle between the second-part engagement surface and the virtual plane, coincident with the first-part engagement surface, is less than 90°.

9. A system for dispensing adhesive between a first part and a second part, the system comprising:
   a nozzle, comprising:
      a nozzle body, comprising:
         a first-part engagement surface;
         a second-part engagement surface, contiguous with the first-part engagement surface and defining an engagement-surface angle, greater than 0° and less than 180°, with a virtual plane, coincident with the first-part engagement surface;
         a nozzle-body outlet port, formed in the second-part engagement surface; and
         a nozzle-body inlet port, formed in the first-part engagement surface; and
      a separator plate, coupled with and extending from the nozzle body;
   a reservoir, fluidically coupled with the nozzle-body outlet port;
   a vacuum source, fluidically coupled with the nozzle-body inlet port; and
   a vehicle, supporting the nozzle.

10. The system according to claim 9, wherein:
    the vehicle comprises a crawler that is selectively movable relative to the reservoir and the vacuum source; and
    the nozzle is coupled to the crawler such that movement of the crawler, relative to the reservoir and the vacuum source, correspondingly moves the nozzle relative to the reservoir and the vacuum source.

11. The system according to claim 10, wherein the crawler comprises:
    wheels; and
    a motor, coupled to at least one of the wheels and selectively operable to rotate at least the one of the wheels.

12. The system according to claim 9, wherein:
    the vehicle comprises a robotic arm;
    the nozzle is coupled to the robotic arm; and
    the robotic arm is configured to move the nozzle relative to the reservoir and the vacuum source.

13. The system according to claim 9, wherein:
    the vehicle comprises a handle that is manually movable relative to the reservoir and the vacuum source; and
    the nozzle is coupled to the handle.

14. The system according to claim 9, wherein:
    the vehicle comprises an articulated structure, comprising segments;
    adjacent ones of the segments are coupled to each other, such that the adjacent ones of the segments are pivotable, relative to each other, about a first axis and a second axis; and
    the first axis is perpendicular to the second axis.

15. The system according to claim 9, further comprising a sensor, coupled to the vehicle and movable relative to the nozzle.

16. The system according to claim 9, further comprising:
- a magnetic coupling assembly, coupled to the vehicle and comprising:
  - a first magnetic coupler, attached to the vehicle; and
  - a second magnetic coupler, magnetically coupleable to the first magnetic coupler; and
- a sensor, attached to the second magnetic coupler.

17. The system according to claim 9, further comprising:
- a magnetic coupling assembly, coupled to the vehicle and comprising:
- a first magnetic coupler, attached to the vehicle; and
- a second magnetic coupler, magnetically coupleable to the first magnetic coupler;
- a heat source, attached to the second magnetic coupler; and
- an infrared camera, attached to the second magnetic coupler, such that the infrared camera is stationary relative to the heat source.

18. The system according to claim 9, wherein the vehicle comprises a roller, rotatable relative to the nozzle.

19. The system according to claim 18, wherein the vehicle further comprises a roller-biasing spring, coupled to the roller and configured to bias the roller away from the vehicle.

20. The system according to claim 9, further comprising a biasing member, coupled to the nozzle and configured to bias the separator plate away from the vehicle.

* * * * *